US008529865B2

(12) United States Patent
Belt et al.

(10) Patent No.: US 8,529,865 B2
(45) Date of Patent: Sep. 10, 2013

(54) CONVERSION OF PRODUCED OXYGENATES TO HYDROGEN OR SYNTHESIS GAS IN A CARBON-TO-LIQUIDS PROCESS

(75) Inventors: Barbara A. Belt, Seabrook, TX (US); Sara Irina Kopponen, Anchorage, AK (US); Ralph T. Goodwin, III, Ponca City, OK (US); Mariella L. Raven, Houston, TX (US); Blaine E. Beck, Katy, TX (US)

(73) Assignee: Phillips 66 Company, Houston, TX (US)

( * ) Notice: Subject to any disclaimer, the term of this patent is extended or adjusted under 35 U.S.C. 154(b) by 461 days.

(21) Appl. No.: 12/039,882

(22) Filed: Feb. 29, 2008

(65) Prior Publication Data
US 2009/0221720 A1 Sep. 3, 2009

(51) Int. Cl.
*C01B 3/24* (2006.01)
*C01B 3/38* (2006.01)

(52) U.S. Cl.
USPC .......................................... 423/650; 252/373

(58) Field of Classification Search
USPC ......................................... 623/650; 423/650
See application file for complete search history.

(56) References Cited

U.S. PATENT DOCUMENTS

| | | | | |
|---|---|---|---|---|
| 2,464,501 A * | 3/1949 | Grahame | .................. | 518/703 |
| 2,472,219 A | 6/1949 | Lyons | | |
| 2,533,675 A * | 12/1950 | Marschner | .................. | 518/724 |
| 2,542,517 A | 2/1951 | Hemminger | | |
| 2,556,861 A * | 6/1951 | Voorhies, Jr. et al. | ........ | 518/706 |
| 2,623,057 A * | 12/1952 | Arnold | .......................... | 518/719 |
| 2,838,388 A | 6/1958 | Carkeek et al. | | |
| 4,973,453 A | 11/1990 | Agee | | |
| 5,004,862 A * | 4/1991 | Hildinger et al. | ............. | 585/867 |
| 5,387,322 A | 2/1995 | Cialkowski et al. | | |
| 5,620,670 A | 4/1997 | Benham et al. | | |
| 6,114,400 A | 9/2000 | Nataraj et al. | | |
| 6,225,358 B1 | 5/2001 | Kennedy | | |
| 6,277,894 B1 * | 8/2001 | Agee et al. | .................... | 518/700 |
| 6,533,945 B2 | 3/2003 | Shah | | |
| 6,585,802 B2 * | 7/2003 | Koros et al. | ....................... | 95/51 |
| 6,720,558 B2 * | 4/2004 | Kaneyama | .................... | 250/311 |

(Continued)

FOREIGN PATENT DOCUMENTS
EP 0168892 A2 1/1986

OTHER PUBLICATIONS

Hypertext Copyright (c) 2000 Donal O' Leary, Group VIII Elements; www.uce/academic/chem/dolchem/htm/elem/group.html.*

*Primary Examiner* — Melvin C Mayes
*Assistant Examiner* — Kenneth Vaden
(74) *Attorney, Agent, or Firm* — Phillips 66 Company

(57) ABSTRACT

Processes for making hydrogen and optionally carbon monoxide and their integrations in a Carbon-to-Liquids plant are disclosed. A first syngas produced by a first syngas generator is converted in a hydrocarbon synthesis process to hydrocarbon products, oxygenates and product water comprising dissolved oxygenates. The first syngas generator may use partial oxidation, reforming, gasifying, or pyrolysis of any solid, liquid or gaseous carbonaceous feedstock. The product water may be treated, for example by distillation and/or by stripping, to form an oxygenates-rich stream which comprises a reforming reactant and oxygenates originating from the product water. Oxygenates from the oxygenates-rich stream fed to a second syngas generator are converted under reforming conditions to form at least hydrogen. The hydrogen formed by reforming may be supplied to one or more units using hydrogen within a Carbon-to-Liquids plant.

16 Claims, 12 Drawing Sheets

(56) References Cited

U.S. PATENT DOCUMENTS

| | | |
|---|---|---|
| 6,794,417 B2 | 9/2004 | O'Beck et al. |
| 6,797,243 B2 * | 9/2004 | Arcuri et al. ............ 422/211 |
| 6,946,493 B2 | 9/2005 | Mohedas et al. |
| 6,958,363 B2 | 10/2005 | Espinoza et al. |
| 7,150,831 B2 | 12/2006 | Dancuart-Kohler et al. |
| 7,153,432 B2 | 12/2006 | Kohler et al. |
| 7,235,172 B2 | 6/2007 | Lawson et al. |
| 7,238,215 B2 | 7/2007 | Gauthier et al. |
| 2001/0051662 A1 | 12/2001 | Arcuri et al. |
| 2004/0044263 A1 * | 3/2004 | De Wet et al. ............ 585/862 |
| 2006/0013759 A1 * | 1/2006 | Jiang et al. ............ 423/648.1 |
| 2007/0282018 A1 * | 12/2007 | Jenkins et al. ............ 518/702 |

* cited by examiner

CONVERSION OF PRODUCED OXYGENATES TO HYDROGEN OR SYNTHESIS GAS IN A CARBON-TO-LIQUIDS PROCESS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

This invention pertains to a carbon-to-liquids process which converts carbonaceous material to water, synthetic hydrocarbons, and oxygenates. The carbon-to-liquids process may employ one or more carbonaceous materials as feedstocks, and uses the produced oxygenates from product water to boost production of synthesis gas or hydrogen.

2. Background of the Invention

Generally, fuels produced from non-petroleum sources have been so expensive relative to fuels refined from crude oil that production has been very low. However, due to recent high prices for crude oil and due to significant increase in transportation fuels demand not met by current production from petroleum, there is a renewed interest in the development of economical processes for the conversion of various carbonaceous materials other than crude oil, such as for example coal, petroleum coke, tar sands, shale oil, natural gas and/or biomass. As used hereinafter, this type of conversion will be identified as 'Carbon-to-Liquids' conversion or 'CTL', regardless of what form (such as solid, liquid or gas) the carbonaceous feedstock may be.

One CTL process converts coal to synthetic hydrocarbons, and is generally known as a coal-to-liquids process. It has been known for several decades that coal can be converted to useful products by a large variety of gasification and liquefaction processes. Extensive research work has been done in connection with coal gasification and in connection with deep hydrogenation coal liquefaction in an attempt to produce liquid and gaseous fuels at reasonable cost. Two basic methods are used for converting solid carbonaceous material (e.g., coal) to liquid fuel. One method involves gasification of the coal and subsequent conversion of the generated gas to transportation fuels (e.g., gasoline), for example by the Fischer-Tropsch synthesis. The other method involves mixing dry pulverized coal particles with recycled solvent oil to produce a slurry and passing the slurry with hydrogen through a high-temperature high-pressure reactor to effect hydrogenation and hydrocracking. Almost all such processes for producing liquid fuel from coal include the manufacture of hydrogen or a mixture of hydrogen and carbon monoxide, also called 'synthesis gas' or 'syngas'. Heretofore, the cost of producing the hydrogen from coal has been excessive, and the hydrogen produced has not been used in the most effective manner.

Another CTL process converts natural gas to synthetic hydrocarbons, and is generally known as a gas-to-liquids process or 'GTL'. Large quantities of natural gas are available in many areas of the world, and natural gas is predicted to outlast oil reserves by a significant margin. However, large natural gas reserves have been found in remote areas where it is uneconomical to develop the reserves due to the lack of local markets for the gas and the high cost of transporting the gas to distant markets. This high cost is often related to the extremely low temperatures needed to liquefy the highly volatile gas during transport, a technology which yields a Liquefied Natural Gas or 'LNG'. An alternative is to locally convert the natural gas to liquid higher boiling point hydrocarbon products that can be transported more cost effectively. Processes for converting natural gas to heavier hydrocarbon liquids are generally known in the art.

The CTL process generally involves two sequential steps for converting a carbonaceous feedstock to liquid products (e.g., synthetic transportation fuels). In the first step, carbonaceous feedstock is converted to form at least a mixture of carbon monoxide and hydrogen, also knows as 'synthesis gas' or 'syngas'). In the second step employing the Fischer-Tropsch synthesis, carbon monoxide and hydrogen (formed from the first step) are converted into water and hydrocarbonaceous compounds. For example, the GTL process involves first reacting natural gas or methane, the major chemical component of natural gas, with oxygen and/or steam to form a mixture of carbon monoxide and hydrogen, and then employing the Fischer-Tropsch synthesis which converts synthesis gas into water and hydrocarbonaceous compounds. Cobalt, iron, ruthenium and/or nickel have been used as catalytic metal employed in catalysts used in Fischer-Tropsch synthesis for the production of diesel and/or gasoline fuels. Cobalt-based and iron-based catalysts are generally used for commercial-scale Fischer-Tropsch processes, in which production of hydrocarbons with five carbons or more (also called '$C_{5+}$ hydrocarbons') exceeds 25,000 barrels per day.

The hydrocarbonaceous compounds formed during the Fischer-Tropsch synthesis may include paraffins, olefins, and oxygen-containing compounds, also called 'oxygenates'. Some of these hydrocarbonaceous compounds are water-soluble. Typically, the Fischer-Tropsch product stream contains hydrocarbonaceous compounds having a range of numbers of carbon atoms varying from 1 to 100 or more, and thus having a range of molecular weights. Therefore, the Fischer-Tropsch products produced by conversion of synthesis gas commonly contain a range of hydrocarbons including gases, liquids and waxes. Depending on the molecular weight product distribution, different Fischer-Tropsch product mixtures are ideally suited to different uses. For example, Fischer-Tropsch product mixtures containing liquids may be processed to yield transportation fuels (e.g., gasoline, jet fuel, diesel fuel). Hydrocarbon waxes (which are highly paraffinic) may be subjected to a cracking step to break large wax molecules into smaller ones for conversion to liquid and/or gaseous hydrocarbons. Paraffins are particularly desirable as the basis of synthetic diesel fuel and/or jet fuel. In the production of a synthetic fuel using Fischer-Tropsch synthesis, it is generally desirable to maximize the production of high value liquid and/or wax hydrocarbons, such as hydrocarbons with at least 5 carbon atoms per hydrocarbon molecule ($C_{5+}$ hydrocarbons).

In addition to the hydrocarbon products of the Fischer-Tropsch process, product water is formed as shown in the following Equation (1):

$$nCO + 2nH_2 \rightarrow C_nH_{2n} + nH_2O. \tag{1}$$

The water production is quite significant because a mole of water is typically produced for every mole of carbon monoxide converted. The composition of the product water is largely dependent on the catalyst metal used in the Fischer-Tropsch process and the reaction conditions (e.g., temperature, pressure) employed. For non-shifting catalysts such as employing cobalt and/or ruthenium, the water gas shift reaction is minimal so the water production with non-shifting catalysts approaches that of the reaction stoichiometry. For shifting catalysts such as employing iron, the water gas shift reaction is more prominent, so the overall water production with shifting catalysts may be less than the reaction stoichiometry predicts.

The water produced from the Fischer-Tropsch synthesis generates at least one water source for the various aspects of the process according to the present invention and will be denoted in this specification by the term "product water." Typically, the product water contains water-soluble and/or dispersed organic compounds. The organic compounds may include oxygenates such as aliphatic, aromatic and cyclic alcohols, aldehydes, ketones and organic acids, and to a lesser extent suspended non-oxygenated aliphatic, aromatic and cyclic hydrocarbons, such as olefins and paraffins. The Fischer-Tropsch product water may also contain small quantities of inorganic compounds including metals from the Fischer-Tropsch reactor, as well as nitrogen and sulfur-containing species that originate from the carbonaceous feedstock used in the first step of a CTL process. Typical organic contents in Fischer-Tropsch product water may be found for example in U.S. Pat. No. 7,150,831 by Dancuart Kohler et al and U.S. Pat. No. 7,153,432 by Kohler et al.

The product water from the Fischer-Tropsch synthesis is generally recovered from the gas effluent exiting the Fischer-Tropsch reactor. The recovery proceeds by passing the gas effluent through a separation unit. The separation may include condensing the gas effluent in a typical three-phase separator or in a series of hot and cold separators to generate three separate streams. The three streams exiting the separator(s) are: a tail gas, a hydrocarbon condensate including mainly hydrocarbons in the $C_5$ to $C_{20}$ range, and a product water stream. Additionally, a much smaller portion of the overall water production may be recovered from a liquid product stream exiting the Fischer-Tropsch reactor, by employing for example a separation technique such as filtration, settling, stripping and/or centrifugation.

The Fischer-Tropsch product water contains relatively high concentrations of oxygenates and other organic compounds, in particularly when originating from a high-temperature Fischer-Tropsch synthesis. Direct application or disposal of the Fischer-Tropsch product water is generally not feasible without further treatment to remove undesirable constituents. Environmental concerns prevent the disposal of product water derived from Fischer-Tropsch synthesis into natural water ways and the sea thereby presenting a case for the production and recovery of useable water at the source of the carbonaceous feedstocks.

In certain areas where carbonaceous feedstocks to the CTL plant are to be found and where the CTL plant is built, water may be in short supply and a relatively costly commodity. Because the product water may have little commercial value and freshwater may be in short supply within the vicinity of the CTL plant, the Fischer-Tropsch product water is usually purified for reuse within the CTL process, although a small portion of the purified water may be disposed off. The purification may entail removal of the dissolved and suspended organic compounds for example by biological treatment in a wastewater facility to generate the purified water. The degree of purification/treatment of the Fischer-Tropsch product water depends largely on the intended applications, and it is possible to produce a wide range of water qualities ranging from boiler feed water to partially treated water which may be suitable for discharge to the environment.

In addition, because the Fischer-Tropsch product water may contain a significant amount of organic compounds, some of the carbon value may be recovered by separating some of the organic components into different chemical stocks and/or solvents for potential sale to various niche markets. The recovery of chemical byproducts of commercial value from the product water may render the water purification process more economical. The revenues the sales generate and the expected savings from a substantially reduced load on a wastewater biological treatment plant may potentially offset the cost of recovering certain chemical byproducts (e.g., oxygenates dissolved in the product water). Drawbacks to this purification scheme however include high costs of building and operating a large wastewater treatment facility supplied with a high carbon load, and/or designing, building and operating a myriad of processes to recover from the product water certain byproducts (e.g., oxygenates and/or hydrocarbons) of particular high economic value. Indeed, these extra recoveries/separations must be tailored to the type of oxygenates generated by the operating conditions and the type of catalyst used in the Fischer-Tropsch synthesis. For example, a product water from a high-temperature Fischer-Tropsch synthesis contains a lot more dissolved oxygenates than a product water from a low-temperature Fischer-Tropsch synthesis. Or a product water from a low-temperature iron-based Fischer-Tropsch synthesis contains more dissolved and/or suspended olefins, oxygenates and aromatics than a product water from a low-temperature cobalt-based Fischer-Tropsch synthesis.

Beside issues regarding costs of product water purification and oxygenates separation/recovery, CTL processes, and particularly GTL processes, generally use hydrogen ($H_2$) or hydrogen-rich gases for example for adjusting the hydrogen content of the syngas feed, for catalyst activation/regeneration and/or for upgrading of hydrocarbons products for example by hydroprocessing. However, hydrogen may be in short supply in CTL processes depending on the carbonaceous feedstock(s) and the type of syngas generators which are employed in the CTL plant. Furthermore, hydrogen is generally expensive to produce. The hydrogen can be produced by water hydrolysis, but it is more economically produced from a syngas generator which can provide a high hydrogen yield, such as a reforming reactor employing steam. The steam for such reforming reactor generally originates from natural sources of freshwater, such as from rivers or lakes. Drawbacks to using freshwater include the cost of acquiring (such as pumping) and processing the freshwater (such as removing particulates).

Thus for at least the foregoing reasons, there is a need for reducing the costs of purifying product water from the Fischer-Tropsch synthesis and/or other used water streams generated in a CTL plant in a wastewater treatment facility. In addition, there is a need for a more economical way to produce steam for steam-utilizing syngas generation. There is a further need for a more economical way to boost hydrogen production in a CTL plant. There is also a need to improve carbon utilization and recovery of water-soluble organic byproducts (e.g., oxygenates) for reuse in the overall CTL process. Further needs include more efficient ways for improving carbon efficiency and/or reusing the Fischer-Tropsch product water in lieu of treating this water with a sizeable carbon load at a large expense in a wastewater facility.

BRIEF SUMMARY OF THE INVENTION

These and other needs in the art are addressed in a first aspect of the present invention by a process for making hydrogen and optionally carbon monoxide. The process includes feeding oxygenates to a reforming zone under suitable conditions to convert at least a portion of oxygenates to form at least hydrogen. The reforming zone comprises a reforming catalyst. The oxygenates supplied to the reforming zone may originate at least in part from a product water of a hydrocarbon synthesis reactor, or from other water sources generated within a carbon-to-liquids process.

The process for making $H_2$ and optionally CO may further include generating a steam product. In some embodiments, the steam product is generated by vaporizing a process water feed comprising at least a portion of oxygenates originating from a hydrocarbon synthesis product water. In this manner, the generated steam product contains at least a portion of oxygenates originating from a hydrocarbon synthesis product water and further contains steam as a reforming reactant. In alternate embodiments of the process, the steam may be generated by vaporizing freshwater or treated water which is substantially free of oxygenates (such as less than 0.1 wt. %).

The process water may further comprise passing a product water recovered from the hydrocarbon synthesis process through a treatment unit to form an oxygenates-rich stream. The treatment step may be effective in increasing the content in water-soluble oxygenates in the water and/or may selectively enrich the water in certain water-soluble oxygenates, for example increasing the content in non-acidic water-soluble oxygenates. Additionally or alternatively, the treatment step may be effective in decreasing the content in acidic water-soluble oxygenates or in substantial removal of acidic water-soluble oxygenates.

In additional or alternate embodiments, the oxygenates-rich stream may comprise at least a portion of oxygenates originating from a hydrocarbon synthesis product water. The oxygenates-rich stream may be formed by passing a stripping fluid through a product water comprising oxygenates synthesized in the hydrocarbon synthesis process and originating from the hydrocarbon synthesis product water in such a manner than some of the oxygenates and the stripping fluid absorbing them form at least a portion of or the totality of the oxygenates-rich stream which is fed to the reforming zone. The stripping fluid may include an organic reforming reactant, for example, natural gas or at least a hydrocarbon component of natural gas such as a $C_1$-$C_5$ hydrocarbon (e.g., methane, ethane) or any combinations of $C_1$-$C_5$ hydrocarbons, and/or an inorganic reforming reactant selected from the group consisting of steam, carbon dioxide, and combinations thereof.

The step of feeding oxygenates may comprise feeding an oxygenates-rich stream comprising steam and oxygenates originating from a hydrocarbon synthesis product water, or may comprise feeding an oxygenates-rich stream comprising an organic reforming reactant and oxygenates originating from a hydrocarbon synthesis product water in addition to feeding an inorganic reforming reactant comprising steam, carbon dioxide, or combinations thereof.

A first aspect of the present invention relates to a process for making hydrogen and optionally carbon monoxide from the conversion of oxygenates originating from a hydrocarbon synthesis product water in a carbon-to-liquids process.

The process according to the first aspect of the present invention may comprise the following steps: (a) providing a syngas generator comprising a reforming zone; (b) providing a process water stream comprising oxygenates originating from a hydrocarbon synthesis product water; (c) treating the process water stream to form an oxygenates-rich stream, the oxygenates-rich stream comprising a reforming reactant and oxygenates originating from the hydrocarbon synthesis product water, wherein the treating step to form the oxygenates-rich stream comprises at least one of the following treatment steps: passing the process water stream through a distillation unit; stripping the process water stream with a stripping fluid comprising the reforming reactant; or passing the process water stream through a distillation unit to form an oxygenates overhead stream and then stripping the oxygenates overhead stream with a stripping fluid comprising the reforming reactant; and (d) passing the oxygenates-rich stream through the reforming zone in the syngas generator under reforming promoting conditions for the conversion of the oxygenates and the reforming reactant to form at least hydrogen and optionally carbon monoxide, and to generate a synthesis gas stream comprising said formed hydrogen and optionally said formed carbon monoxide.

A second aspect of the present invention relates to a process for making synthetic hydrocarbons, hydrogen and optionally carbon monoxide from the conversion of oxygenates originating from a hydrocarbon synthesis product water in a carbon-to-liquids plant comprising two syngas generators operated in parallel.

The process according to the second aspect of the present invention may comprise the following steps: (a) converting a carbonaceous feedstream in a first syngas generator to form a first synthesis gas stream comprising carbon monoxide and hydrogen; (b) feeding the first synthesis gas stream or a portion thereof to a hydrocarbon synthesis reactor comprising a hydrocarbon synthesis catalyst under promoting conditions sufficient to produce synthetic hydrocarbons, product water, and oxygenates, thereby generating a hydrocarbon product stream and a process water stream, the hydrocarbon product stream comprising at least a portion of said synthetic hydrocarbons, the process water stream comprising at least a portion of the produced oxygenates dissolved in at least a portion of product water; (c) treating the process water stream to form an oxygenates-rich stream, the oxygenates-rich stream comprising a reforming reactant and oxygenates originating from the hydrocarbon synthesis product water, wherein the treating step to form the oxygenates-rich stream comprises one of the following steps: passing the process water stream through a distillation unit; stripping the process water stream with a stripping fluid comprising the reforming reactant; or passing the process water stream through a distillation unit to form an oxygenates overhead stream and then stripping the oxygenates overhead stream with a stripping fluid comprising the reforming reactant; and (d) passing the oxygenates-rich stream in a reforming zone in a second syngas generator under reforming promoting conditions sufficient for the conversion of the oxygenates and the reforming reactant to form at least hydrogen and optionally carbon monoxide, and to generate a second synthesis gas stream comprising said formed hydrogen and optionally said formed carbon monoxide.

In some embodiments of the process according to the second aspect, the carbonaceous feedstream fed to the first syngas generator used in step (b) comprises a material selected from the group consisting of coal, coke, biomass, a light hydrocarbon having 1 to 5 carbon atoms, tar sand, shale oil, and any combinations of two or more materials thereof.

In preferred embodiments of the process according to the second aspect, the carbonaceous feedstream fed to the first syngas generator may comprise a light hydrocarbon having 1 to 5 carbon atoms. The first syngas generator employs $O_2$ and comprises oxidative conversion promoting conditions for the partial oxidation of a light $C_1$-$C_5$ hydrocarbon to $H_2$ and CO.

In alternate embodiments of the process according to the second aspect, the carbonaceous feedstream fed to the first syngas generator may comprise a solid carbonaceous feedstream such as coal, coke, tar sand, or biomass. The first syngas generator employs gasification or pyrolysis for the conversion of the solid carbonaceous feedstream to form $H_2$ and CO and/or $CO_2$. No $O_2$ is supplied to the second syngas generator comprising the reforming zone.

In some embodiments of the process according to the second aspect, the second synthesis gas stream generated by the second syngas generator has a $H_2$:CO molar greater than the first synthesis gas stream generated by the first syngas generator.

In the second aspect of the present invention, the first syngas generator may comprise oxidative or non-oxidative conversion promoting conditions, while the second syngas generator comprises non-oxidative conversion promoting conditions.

In preferred embodiments of the second aspect of the present invention wherein the first syngas generator comprises oxidative conversion promoting conditions and the second syngas generator comprises non-oxidative conversion promoting conditions, the treating step (c) of the process water stream may comprise the following steps: (c1) passing the process water stream through a distillation unit to form an oxygenates overhead stream; and then (c2) stripping the oxygenates overhead stream with a stripping fluid comprising a reforming reactant to form the oxygenates-rich stream comprising the reforming reactant and oxygenates originating from the hydrocarbon synthesis product water. In such embodiments, the reforming reactant may comprise a $C_1$-$C_5$ light hydrocarbon, mixtures thereof, or natural gas. The oxygenates-rich stream generated in step (c) and steam are then fed to the non-oxidative second syngas generator under steam reforming promoting conditions sufficient for the conversion of the oxygenates and steam as the reforming reactant to form at least hydrogen, optionally carbon monoxide and optionally carbon dioxide, and to generate the second synthesis gas stream comprising said formed hydrogen. The second synthesis gas stream optionally comprises said formed carbon monoxide and/or said formed carbon dioxide.

In some embodiments according to the various aspects of the invention, the process may further comprise the following step: (e) supplying at least a portion of the hydrogen formed in step (d) in at least one of the units selected from the group consisting of a water-gas shift reactor; a hydrogen separation unit; a hydrocarbon synthesis reactor; a catalyst activation unit; a catalyst regeneration unit, a product upgrading unit, and combinations thereof. Step (e) may be performed in order to enhance at least one factor selected from the group consisting of market value of synthetic hydrocarbons; productivity of a hydrocarbon synthesis reactor; activity of a hydrocarbon synthesis catalyst; longevity of a hydrocarbon synthesis catalyst; and any combinations of two or more factors thereof.

In some embodiments according to the various aspects of the invention, treating the process water stream in step (c) may be effective in removing acidic oxygenates to provide an oxygenates-rich stream substantially free of acidic oxygenates.

In some embodiments according to the various aspects of the invention, the reforming reactant in the oxygenates-rich stream may comprise an organic reforming reactant selected from the group consisting of a $C_1$-$C_5$ hydrocarbon, a mixture of $C_1$-$C_5$ hydrocarbons, an alcohol, a mixture of alcohols, and combinations thereof, and step (d) further comprises feeding, to the reforming zone, an inorganic reforming reactant selected from the group consisting of steam, carbon dioxide, and combinations thereof.

In some embodiments according to the various aspects of the invention, the reforming reactant in the oxygenates-rich stream is water in liquid phase, water in vapor phase, carbon dioxide, or combinations thereof.

In some embodiments according to the various aspects of the invention, the reforming zone comprises steam reforming promoting conditions, and the process further comprises, after step (c) and prior to step (d), passing the oxygenates-rich stream through a steam generator to generate a steam product, whereby the generated steam product comprises steam as the reforming reactant and at least a portion of said oxygenates originating from said hydrocarbon synthesis process water stream and further wherein the generated steam product is fed to said reforming zone in step (d).

When the reforming zone comprises steam reforming promoting conditions, treating in step (c) may comprise passing the process water stream through a distillation unit to form an oxygenates overhead stream and then passing the oxygenates overhead stream through a steam generator to generate a steam product which provides the oxygenates-rich stream comprising steam as the reforming reactant.

Alternatively, when the reforming zone comprises steam reforming promoting conditions, treating in step (c) may comprise stripping the process water stream with a stripping fluid comprising steam to provide the oxygenates-rich stream comprising steam as the reforming reactant.

In another alternate embodiment, treating in step (c) may comprise stripping the process water stream with a stripping fluid comprising an organic reforming reactant to provide the oxygenates-rich stream, wherein the oxygenates-rich stream comprises an organic reforming reactant selected from the group consisting of a $C_1$-$C_5$ hydrocarbon, a mixture of $C_1$-$C_5$ hydrocarbons, an alcohol, a mixture of alcohols, and combinations thereof, and further wherein step (d) further comprises feeding steam to the reforming zone.

In yet another alternate embodiment when the reforming zone comprises steam reforming promoting conditions, treating in step (c) may comprise passing said process water stream through a distillation unit to form an oxygenates overhead stream and then stripping the oxygenates overhead stream with a stripping fluid comprising steam to provide the oxygenates-rich stream comprising steam as the reforming reactant.

In still yet another alternate embodiment when the reforming zone comprises steam reforming promoting conditions, treating in step (c) may comprise passing the process water stream through a distillation unit to form an oxygenates overhead stream and then stripping the oxygenates overhead stream with a stripping fluid comprising an organic reforming reactant to provide the oxygenates-rich stream, wherein the oxygenates-rich stream comprises the organic reforming reactant, being selected from the group consisting of a $C_1$-$C_5$ hydrocarbon, a mixture of $C_1$-$C_5$ hydrocarbons, an alcohol, a mixture of alcohols, and combinations thereof. In such embodiment, the reforming step (d) in the process may further comprise feeding steam to the reforming zone.

In an embodiment when the reforming zone comprises aqueous liquid-phase reforming promoting conditions, treating in step (c) may comprise passing the process water stream through a distillation unit to form an oxygenates overhead stream which provides the oxygenates-rich stream in which the reforming reactant is water.

In an embodiment when the reforming zone comprises dry reforming promoting conditions, treating in step (c) may comprise stripping the process water stream with a stripping fluid comprising an organic reforming reactant to provide the oxygenates-rich stream, wherein the oxygenates-rich stream comprises the organic reforming reactant, and further wherein the organic reforming reactant may be selected from the group consisting of a $C_1$-$C_5$ hydrocarbon, a mixture of $C_1$-$C_5$ hydrocarbons, an alcohol, a mixture of alcohols, and combinations thereof. In such embodiment, the reforming step (d) in the process may further comprise feeding $CO_2$ to the reforming zone.

In an alternate embodiment when the reforming zone comprises dry reforming promoting conditions, step (d) may further comprise feeding $CO_2$ to the reforming zone, and treating in step (c) may comprise passing the process water stream through a distillation unit to form an oxygenates overhead stream and then stripping the oxygenates overhead stream with a stripping fluid comprising an organic reforming reactant to provide the oxygenates-rich stream, wherein the oxygenates-rich stream comprises the organic reforming reactant, and further wherein the organic reforming reactant may be selected from the group consisting of a $C_1$-$C_5$ hydrocarbon, a mixture of $C_1$-$C_5$ hydrocarbons, an alcohol, a mixture of alcohols, and combinations thereof.

The process according to the various aspects of the invention may further comprise pretreating the process water stream prior to performing treating in step (c). Pretreating may comprise at least one of the following steps selected from the group consisting of: adjusting the pH of the process water stream to a desired value; adjusting the temperature of the process water stream; removing solids from the process water stream; removing metals from the process water stream; removing insoluble or suspended organics from the process water stream; removing acidic oxygenates from the process water stream; concentrating oxygenates in the process water stream; diluting the process water stream with freshwater or purified water; and any combinations of two or more of these steps.

In some embodiments, step (d) may further comprise contacting a generated steam product comprising oxygenates and steam as the reforming reactant with a reforming catalyst under steam reforming promoting conditions to convert at least a portion of the oxygenates to form at least hydrogen.

In alternate embodiments, step (d) may further comprise contacting a generated steam and an organic feed comprising oxygenates with a reforming catalyst under suitable conditions to convert at least a portion of the oxygenates with steam to form at least hydrogen.

In yet other embodiments, step (d) may further comprise contacting a generated steam and an organic feed, both feeds comprising oxygenates, with a reforming catalyst under suitable conditions to convert at least a portion of the oxygenates with steam to form at least hydrogen.

In any of the foregoing embodiments, the contacting step may be further under suitable conditions to convert at least a portion of the organic feed with steam to form at least hydrogen. The suitable conditions during contact may also allow the conversion of at least a portion of the oxygenates and/or at least a portion of the organic feed with steam to also form carbon dioxide and/or carbon monoxide.

In one yet another alternate embodiment, step (d) may further comprise contacting a liquid product water comprising oxygenates with a reforming catalyst under aqueous-phase reforming conditions suitable to convert at least a portion of the oxygenates with water to form at least hydrogen.

A reforming effluent (which may also be known as 'synthesis gas stream' or 'second synthesis gas stream') exiting the reforming zone is formed by such process, wherein the reforming effluent comprises the formed hydrogen, but may also comprise formed carbon monoxide, formed and/or unreacted carbon dioxide, and/or unreacted oxygenates. If an additional organic feed is supplied to the reforming zone, the reforming effluent may also comprise unreacted organic component(s) of the organic feed.

The reforming zone may comprise steam reforming promoting conditions, dry reforming promoting conditions, combined dry and steam reforming promoting conditions, or aqueous liquid-phase reforming promoting conditions.

The process according to various aspects of the present invention may further comprise treating the process water stream to form an oxygenates-rich stream prior to reforming step (d), and further wherein the oxygenates-rich stream is fed to the reforming zone to provide oxygenates to step (d). The treating of the process water stream may be effective in removing acidic oxygenates, so that the oxygenates-rich stream fed to the reforming zone is substantially free of acidic oxygenates.

The treating of the process water stream may be carried out by equilibrium staged separation, by stripping with a striping fluid, or by equilibrium staged separation followed by stripping with a stripping fluid. The stripping fluid preferably comprises a reforming reactant. The reforming reactant in the stripping fluid may comprise an organic reactant selected from the group consisting of a $C_1$-$C_5$ hydrocarbon, any mixture of $C_1$-$C_5$ hydrocarbons, an alcohol, any mixture of alcohols, and combinations thereof. The reforming reactant in the stripping fluid may comprise an inorganic reactant selected from the group consisting of steam, carbon dioxide, and combinations thereof. The reforming reactant in the stripping fluid may be natural gas or at least one $C_1$-$C_5$ hydrocarbon component of natural gas such as methane, a major component of natural gas.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Herein will be described in detail, specific embodiments of the present invention, with the understanding that the present disclosure is to be considered an exemplification of the principles of the invention, and is not intended to limit the invention to that illustrated and described herein. The present invention is susceptible to embodiments of different forms or order and should not be interpreted to be limited to the specifically expressed processes or systems or applications contained herein. In particular, various embodiments of the present invention provide a number of different combinations of features to generate hydrogen and optionally carbon monoxide or carbon dioxide, and to further generate synthetic hydrocarbons, water and oxygenates.

The 'oxygenated organic compounds' and 'oxygenates' are used interchangeably throughout the specification and are meant to represent oxygen-containing organic products which are made in a CTL process, and particularly made in a hydrocarbon synthesis process, and which are dissolved in the bulk of a water stream.

FIG. 1-6 illustrates various embodiments according to the first aspect of the invention embodying a process for making hydrogen and optionally carbon monoxide.

FIG. 7-14 illustrates various embodiments according to the second aspect of the invention embodying a process for making synthetic hydrocarbons, hydrogen and/or syngas. Each of the CTL plants in FIG. 7-14 integrates at least one system from FIG. 1-6 for the production of hydrogen and optionally CO according to the first aspect of the invention.

Systems and Processes for Producing Hydrogen and Optionally Carbon Monoxide

Figure 1:
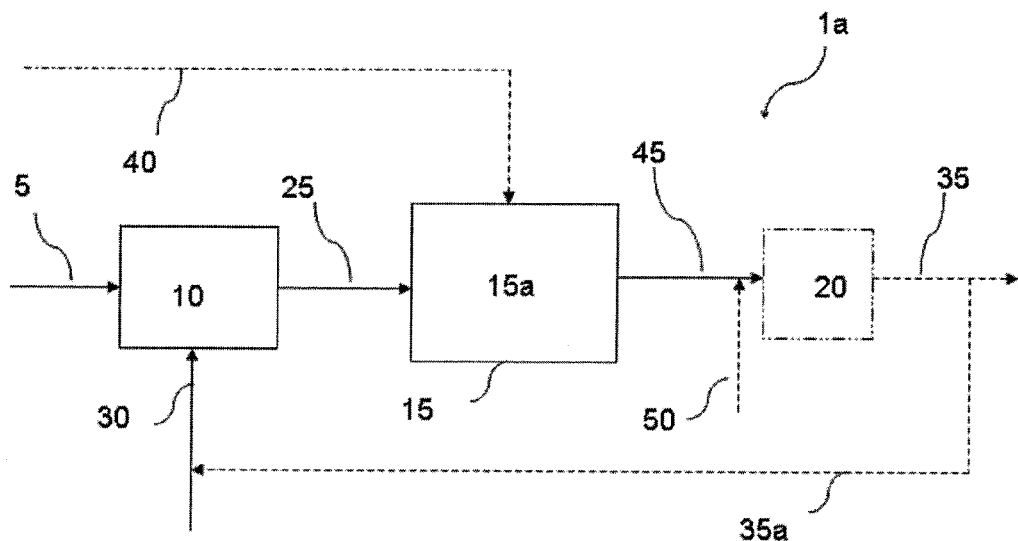
FIG. 1 illustrates a first embodiment of a system (1a) for making hydrogen and optionally carbon monoxide which comprises a steam generator, a reforming zone, and a water-gas shift zone, and in which the reforming zone may receive oxygenates carried by steam generated by the steam generator and/or by an optional organic feed.

FIG. 1 illustrates a system (1*a*) for the production of hydrogen and optionally carbon monoxide which comprises a steam generator (10), a syngas generator (15), and a water-gas shift (WGS) zone (20). Syngas generator (15) comprises a catalytic reforming zone (15*a*). Steam generator (10) is configured to receive a process water feed (5). Steam generator (10) may also be configured to receive heat input (30). Steam generator (10) is configured to generate a steam product (25). The catalytic reforming zone (15*a*) in the syngas generator (15) is configured to receive all of or a portion of the steam product (25) generated by steam generator (10). Catalytic reforming zone (15*a*) may be further configured to receive an optional organic feed (40). Catalytic reforming zone (15*a*) comprises reforming conversion promoting conditions to generate a reforming effluent (45). Water-gas shift zone (20) is configured to receive all of or a portion of the reforming effluent (45) generated by the catalytic reforming zone (15*a*). Water-gas shift zone (20) may be configured to further receive a WGS water feed (50). Water-gas shift zone (20) comprises water-gas shift promoting conditions to generate a WGS effluent (35). A portion (35*a*) of the WGS effluent (35) may provide some of the heat input (30) for the steam generator (10) for example by serving as a fuel The system (1*a*) is operated as follows. The process water feed (5) is fed to the steam generator (10) under conditions sufficient to vaporize water and generate steam. Steam product (25) exits steam generator (10). The conditions sufficient to generate steam in the steam generator (10) may be provided by a heat input (30) to effect the vaporization of water into steam.

A portion of or all of steam product (25) exiting steam generator (10) is fed to the catalytic reforming zone (15*a*) in the syngas generator (15). In this instance, steam product (25) may provide an oxygenates-rich stream which supplies oxygenates (as an organic reforming reactant) and steam (as an inorganic reforming reactant) to the reforming zone (15*a*).

Optionally, an organic feed (40) may be fed to the catalytic reforming zone (15*a*). For example, when the steam product (25) fed to the catalytic reforming zone (15*a*) does not have a sufficient organic content to perform the reforming reaction in zone (15*a*), the organic feed (40) may be fed to the catalytic reforming zone (15*a*) to increase the load of organic reforming reactant to the reforming zone (15*a*). In this instance, the steam product (25) may provide an oxygenates-containing stream which supplies a portion of oxygenates (as an organic reforming reactant) and steam (as an inorganic reforming reactant) to the reforming zone (15*a*), while the organic feed (40) supplies another organic reforming reactant to the reforming zone (15*a*).

Oxygenates that are produced by a hydrocarbon synthesis process (such as illustrated as process (75) in FIG. 7-14) and that are dissolved in hydrocarbon synthesis product water may be supplied to the catalytic reforming zone (15*a*) via the generated steam product (25) or via the optional organic feed (40), or via both generated steam product (25) and organic feed (40). Thus, the oxygenates-rich stream which is supplied to the catalytic reforming zone (15*a*) may be or may comprise the generated steam product (25) or the organic feed (40) or both.

The catalytic reforming zone (15*a*) may be operated under steam reforming promoting conditions suitable for the conversion of oxygenates with steam to form at least hydrogen ($H_2$). The suitable conditions in the catalytic reforming zone (15*a*) may further provide the formation of carbon dioxide ($CO_2$) and/or carbon monoxide (CO) from the conversion of oxygenates with steam.

The catalytic reforming zone (15*a*) may be further operated under steam reforming promoting conditions suitable for the conversion of one or more components of the organic feed (40) with steam to form at least hydrogen ($H_2$) and carbon monoxide (CO) and optionally to carbon monoxide ($CO_2$).

The reforming effluent (45) exits the catalytic reforming zone (15*a*) and generally comprises at least the formed $H_2$ and optionally formed CO and/or $CO_2$.

When the reforming effluent (45) comprises CO, a portion of or all of reforming effluent (45) may be fed in addition to WGS water feed (50) to the WGS zone (20). The WGS zone (20) thus receives water in the form of steam, $H_2$ and CO from reforming effluent (45), and is maintained under conditions suitable for the conversion of at least a fraction of CO with water to hydrogen and carbon dioxide ($CO_2$).

WGS effluent (35) exits the WGS zone (20), and generally comprises hydrogen ($H_2$), carbon dioxide ($CO_2$), and unreacted carbon monoxide (CO). The WGS effluent (35) is enriched in hydrogen compared to the reforming effluent (45), and thus may be referred to as 'hydrogen-rich' WGS effluent (35). The $H_2$:CO molar ratio of the WGS effluent (35) is greater than the reforming effluent (45). Although not illustrated, the WGS effluent (45) may be further passed through a purification unit, such for further enriching hydrogen content, decreasing $CO_2$ content. Such embodiment is discussed later in the context of all FIG. 1-14.

In some embodiments, the process water feed (5) contains dissolved and/or dispersed organic compounds. The dissolved organic compounds generally include water-soluble oxygenated organic compounds, also called 'oxygenates'. In preferred embodiments, the process water feed (5) contains dissolved oxygenates originating from a hydrocarbon synthesis product water.

The process water feed (5) may originate from one or more water sources. The one or more water sources may be generated by and/or used in one or more units in a CTL plant. Without wishing to be limiting, examples of suitable water sources for the process water feed (5) include water generated by a synthesis gas generator (such as by an oxidative syngas generator employing an $O_2$ feedstock), product water generated by a hydrocarbon synthesis process (such as by Fischer-Tropsch synthesis); product water generated by an oxygenates synthesis unit (such as a reactor for the production of one or more ethers and/or one or more $C_1$-$C_5$ alcohols); water used and/or generated during catalyst reduction, catalyst activation, catalyst re-activation, catalyst rejuvenation, and/or catalyst regeneration; water used in heat exchangers (such as cooling units using water as cooling medium and/or heating units using steam as heating medium); water generated and/or used in boilers and other types of steam generators; sewer water, which originates from plant drainage; freshwater (such as wells, lakes, rivers, any source of precipitation); or any combinations thereof. Some of these various water sources from a CTL process will be described later in reference to FIG. 7-14.

In some embodiments, the process water feed (5) comprises a water used in and/or generated in a syngas generator, a product water generated by a hydrocarbon synthesis process, a product water generated by an oxygenate synthesis process, or combinations thereof. Preferably, the process water feed (5) comprises at least a portion of a product water stream from a hydrocarbon synthesis process, which preferably includes a Fischer-Tropsch synthesis. The product water from the Fischer-Tropsch process generally contains oxygenates which are a preferred feedstock of organic reforming reactant for the syngas generator (15). The process water feed (5) preferably comprises oxygenates produced in a syngas-to-fuel or syngas-to-lubes conversion processes, including Fischer-Tropsch synthesis, or oxygenates produced in methanol-to-fuel processes, or combinations thereof. The process water feed (5) may further contain non-oxygenated organic compounds or organic compounds having a heteroatom such as sulfur and/or nitrogen. The process water feed (5) may include a freshwater source, such as rainwater or water from a lake or river. It should be noted that the process water feed (5) may further comprise some purified water provided by a wastewater biological treatment facility. Preferably, the combined freshwater and purified water content in the process water feed (5) is small (e.g., less than 10 wt. %). Alternatively, the process water feed (5) may consist essentially of freshwater, purified water, or combinations thereof. For example, the process water feed (5) may contain less than 0.05 wt % organic content.

In some embodiments, the organics in the process water feed (5) may consist essentially of oxygenates dissolved and/or dispersed in the bulk of water, wherein these oxygenates originate from a product water which is formed during the conversion of syngas in a hydrocarbon synthesis process.

In other embodiments, the organics in the process water feed (5) may consist essentially of non-acidic oxygenates dissolved and/or dispersed in the bulk of water, wherein these oxygenates originate from a product water which is formed during the conversion of syngas in a hydrocarbon synthesis process.

In yet other embodiments, the organics in the process water feed (5) may consist essentially of oxygenates dissolved and/or dispersed in water, where these oxygenates originate from a hydrocarbon synthesis process and from another syngas generator not illustrated in FIG. 1 (that is to say, other than the syngas generator (15) such as syngas generator (80) illustrated in FIG. 7-14 and described later). The other syngas generator may comprise oxidative conversion conditions and employs $O_2$ as a feedstock; alternatively the other syngas generator may comprise non-oxidative conversion conditions and does not employ $O_2$ as a feedstock.

In yet other embodiments, the process water feed (5) may consist essentially of a diluted product water, wherein the product water originates from a hydrocarbon synthesis process. The dilution may be effected by addition of purified water and/or freshwater to the product water originating from the hydrocarbon synthesis process. The diluted product water may have a decreased organic content. The dilution may be effective in decreasing the organic content in the water by at least 10%, or by at least 20%, or at least 50%.

In preferred embodiments, the process water feed (5) may consist essentially of a concentrated product water, wherein the product water originates from a hydrocarbon synthesis process. The concentration may be carried out by a treatment method selected from the group consisting of distillation, absorption, adsorption, size-exclusion membrane separation, separation, and any combinations of two or more of these methods. The concentrated product water may have an increased organic content. The treatment method for concentration of organics in product water may be effective in increasing the organic content in the water by at least 10%, or by at least 20%, or at least 50%.

In alternate preferred embodiments, the process water feed (5) may consist essentially of an organics-enriched product water, wherein the product water originates from a hydrocarbon synthesis process. The enrichment may be carried out by a treatment method selected from the group consisting of distillation, absorption, adsorption, size-exclusion membrane separation, and any combinations of two or more of these methods. The treatment method for enrichment of organics in product water may be effective in enriching the product water in specific oxygenates (such as non-acidic oxygenates). The treatment method for enrichment of organics in product water may be effective in increasing the content of non-acidic oxygenates in the water, for example by at least 10%, or by at least 20%, or at least 50%. Additionally or alternatively, the treatment method for enrichment of organics in product water may be effective in reducing the content of certain oxygenates (such as acidic oxygenates) in the water. The treatment method for enrichment of organics in product water may be effective in decreasing the content of acidic oxygenates in the water, for example by at least 10% or by at least 20% or at least 50%. The treatment method for enrichment of organics in product water may be effective in removing substantially all of acidic oxygenates (more than 99% removal) from the water. The treatment method for enrichment of organics in product water may be effective in increasing the content of $C_1$-$C_5$ oxygenates in the water, for example by at least 10%, or by at least 20%, or at least 50%. The treatment method for enrichment of organics in product water may be effective in increasing the content of non-acidic $C_1$-$C_5$ oxygenates in the water, for example by at least 10%, or by at least 20%, or at least 50%.

The process water feed (5) may comprise at least one oxygenate selected from the group consisting of alcohols, aldehydes, ketones, esters, aldols, ethers, organic acids (for example carboxylic acids, such as acetic acid), organic anions (for example carboxylic anions, such as acetate), and any combinations of two or more thereof.

In preferred embodiments, the process water feed (5) may comprise non-acidic oxygenates dissolved in water. Alternatively, the organics in the process water feed (5) may consist essentially of non-acidic oxygenates dissolved in water, e.g., more than 95%, or more than 98%, or more than 99% of the oxygenates dissolved in the process water feed (5) are non-acidic. Non-acidic oxygenates may comprise alcohols, aldehydes, ketones, esters, aldols, ethers, or any combinations of two or more thereof.

The content in oxygenates of the process water feed (5) may be at least 1 wt. %, or at least 2 wt. %, or at least 5 wt. %, or at least 7 wt. %. The oxygenates content in the process water feed (5) may be at most 50 wt. %, or at most 30 wt. %, or at most 20 wt. %, or at most 10 wt. %, or at most 8 wt. %, or at most 7 wt. %. In some embodiments, the oxygenates content in the process water feed (5) may be between 1 wt. % and 10 wt. % or between 1 wt. % and 7 wt. %. In other embodiments, the oxygenates content in the process water feed (5) may be between 5 wt. % and 30 wt. %.

In some embodiments, the process water feed (5) contains at most 1,000 ppm acidic oxygenates, or at most 500 ppm acidic oxygenates, or at most 200 ppm acidic oxygenates.

The process water feed (5) may also contain non-oxygenated hydrocarbons (which do not contain oxygen atoms) such as olefins, paraffins, aromatic hydrocarbons, and poly-aromatic hydrocarbons. These non-oxygenated hydrocarbons may be dissolved and/or dispersed in the bulk of water. These non-oxygenated hydrocarbons may further contain heteroatoms such as sulfur and/or nitrogen. The process water feed (5) may have a very low content in non-oxygenated hydrocarbons, e.g., less than 0.05 wt % of non-oxygenated hydrocarbons, less than 0.02 wt % of non-oxygenated hydrocarbons, or less than 0.01 wt. %, or less than 0.005 wt. %.

The process water feed (5) may also contain inorganic compounds such as traces of metal-containing compounds. Some of the metal-containing compounds may be derived from catalysts and/or equipment used in a CTL plant. For instance, traces of metal-containing compounds may include active components of a Fischer-Tropsch synthesis catalyst and/or a synthesis gas generator catalyst, such as an element from Groups 8, 9, 10 of the Periodic Table of Elements (New IUPAC notation). Preferably however, the process water feed (5) may have a very low metal content, e.g., contains less than 500 ppm metals, or less than 200 ppm metals, or less than 100 ppm metals, or less than 50 ppm metals. In some embodiments, the process water feed (5) may be substantially free of metals, i.e., less than 10 ppm metals.

In some embodiments, the process water feed (5) can be treated or pretreated before being fed to the steam generator (10). The treatment may comprise at least one of the following steps selected from the group consisting of: adjusting the pH of the process water stream to a desired value (e.g., between 6 and 9); adjusting the temperature of the process water stream; removing solids from the process water stream; removing metals from the process water stream; removing insoluble or suspended organics from the process water stream; removing acidic oxygenates from the process water stream; concentrating oxygenates in the process water stream; diluting the process water stream with freshwater or purified water; and any combinations of two or more of these steps.

Treatment of the process water feed (5) may include removal of metals, neutralization of acidity, adjustment of pH, adjustment of organic content, adsorption on solids, removal of suspended solids and/or suspended organic compounds, liquid absorption and/or gas stripping to remove some of the process water contaminants, or any other technique suitable to treat the process water feed (5) before its entry into steam generator (10). It will be understood that the various water sources for the process water feed (5) can be pretreated or treated individually, collectively, or any combinations thereof. Various pretreatment methods will be described later in reference to all FIG. 1-14.

The steam generator (10) can include any equipment suitable for production of steam (25) from the process water feed (5). The heat needed for generating steam in the steam generator (10) may be provided by heat supply (30). The heat supply (30) may be provided by a furnace, a waste heat boiler, a process heat recovery boiler or any other suitable heat generator available to those of skill in the art. The heat supply (30) may use any fuel source. Examples of suitable fuel sources include natural gas, methane, any tail gas from a hydrocarbon synthesis process, coal, coke, hydrogen-containing gas stream or any other suitable fuel source available to those of skill in the art. As a non-limiting example, the hydrogen-rich WGS effluent (35) or a portion thereof (35a) as shown in a dotted line in FIG. 1 may be used as fuel source for heat supply (30) to the steam generator (10).

Steam product (25) exiting the steam generator (10) is fed to the catalytic reforming zone (15a) at any suitable conditions. Steam product (25) which is fed to the catalytic reforming zone (15a) may have a temperature from 90° C. to 1,100° C. (from about 195° F. to about 2,010° F.), or a temperature from 760° C. to 1,000° C. (from about 1,400° F. to about 1,830° F.). Preferably, steam product (25) fed to the catalytic reforming zone (15a) may have a pressure from 480 kPa to 2,800 kPa (from about 70 psi to about 406 psi).

In some embodiments of FIG. 1, the catalytic reforming zone (15a) may be further supplied by the optional organic feed (40).

The organic feed (40) may comprise any organic reforming reactant suitable for a reforming reaction, such as any hydrocarbon and/or any oxygenate, such as an alcohol. The organic feed (40) may comprise a $C_1$-$C_5$ hydrocarbon, a mixture of $C_1$-$C_5$ hydrocarbons, an alcohol, a mixture of alcohols, or combinations thereof. As non-limiting examples, the organic feed (40) may contain methane, ethane, propane, methanol, ethanol, n-propanol, or any combinations thereof. In some embodiments, the organic feed (40) may contain methane and/or methanol. In alternate embodiments, the organic feed (40) may contain ethane. In yet other embodiments, the organic feed (40) may contain $CO_2$. In yet additional or alternative embodiments, the organic content in organic feed (40) may be 98% or greater. The organic feed (40) may contain a single organic component, or may contain a mixture of organic components.

In some embodiments, the organic feed (40) may comprise methane ($CH_4$), for example with at least 70 vol. % in methane content. In some embodiments, the organic feed (40) may consist essentially of methane (e.g., more than 99 vol. % methane). In some embodiments, the organic feed (40) may comprise or may consist essentially of (e.g., more than 99 vol. %) a methane-rich overhead stream from a natural gas demethanizer distillation (not shown) or from a gas plant for separating natural gas.

In some embodiments, the organic feed (40) may comprise ethane, for example with at least 70 vol. % in ethane content. In some embodiments, the organic feed (40) may consist essentially of ethane (e.g., more than 99 vol. % ethane). In some embodiments, the organic feed (40) may comprise or may consist essentially of (e.g., more than 99 vol. %) an ethane-rich overhead stream from a natural gas deethanizer distillation (not shown) or a bottoms stream from a natural gas demethanizer distillation (not shown), or from a gas plant for separating natural gas. Some of these embodiments will be described later in FIGS. 8, 10, and 13.

In some embodiments, the organic feed (40) may contain or may consist essentially of natural gas. In additional or alternate embodiments, the organic feed (40) may contain or consist essentially of natural gas liquids (NGL). In still yet additional or alternate embodiments, the organic feed (40) may contain or consist essentially of liquefied petroleum gas (LPG). In some embodiments, the organic feed (40) may include methanol, or may consist essentially of methanol (e.g., more than 98 vol. % methanol). In preferred embodiments, the organic feed (40) may contain or may consist essentially of a natural gas component. In alternate embodiments, the organic feed (40) may contain or may consist essentially of a natural gas component and oxygenates, wherein the oxygenates originate from a hydrocarbon synthesis process or from an oxygenates synthesis process.

The organic feed (40) is preferably in gaseous form. Any organic component which may be present as a liquid in the organic feed (40) may be vaporized for example by applying heat to and/or by depressurizing the liquid organic component or the organic feed (40) before its entry into the catalytic reforming zone (15a). The heating should be done at a temperature at or above the boiling point of this organic component (present in liquid form) in order to vaporize most of or all of it. The depressurizing should be done at a pressure at or below the bubble point of this organic component (present in liquid form) in order to vaporize most or all of it.

The catalytic reforming zone (15a) in the syngas generator (15) may include any vapor-phase reforming promoting conditions suitable for the conversion of at least one oxygenate (supplied by steam product (25) and/or by organic feed (40)) to form at least $H_2$, and optionally CO and/or $CO_2$.

The catalytic reforming zone (15a) in the syngas generator (15) may include any steam reforming promoting conditions suitable for the conversion of at least one oxygenate with steam to form at least $H_2$, and optionally CO and/or $CO_2$. The reforming effluent (45) exiting catalytic reforming zone (15a) thus comprises the formed $H_2$ and optionally, the formed CO and/or $CO_2$. The reforming conditions in the reforming zone (15a) may further promote the conversion with steam of at least one organic component of the organic feed (40) (other than oxygenates which may also be components in organic feed (40)) to form at least $H_2$, and optionally CO and/or $CO_2$.

Additionally or alternatively, catalytic reforming zone (15a) may include any conditions suitable for promoting dry and steam reforming promoting reactions for converting at least one oxygenate in the presence of carbon dioxide ($CO_2$) and steam to form $H_2$ and CO, and optionally $CO_2$ to generate the reforming effluent (45) comprising the formed $H_2$ and CO, and optionally $CO_2$.

Alternatively (not illustrated), catalytic reforming zone (15a) can further include any conditions suitable for promoting dry reforming reaction for converting at least one oxygenate with carbon dioxide ($CO_2$) to form $H_2$ and CO. In such a case, the steam product (25) may be excluded from the process, and the oxygenate originating from a hydrocarbon synthesis unit may be fed to the reforming zone (15a) through the organic feed (40) and/or through a separate $CO_2$-containing feed (not illustrated)

Reforming reactions taking place in the catalytic reforming zone (15a) include 'vapor-phase' reforming of at least one oxygenate and optionally 'vapor-phase' reforming of an organic component of optional organic feed (40).

Preferred reforming reactions to take place in the catalytic reforming zone (15a) include 'vapor-phase' steam reforming of an organic compound, such as of a hydrocarbon or an alcohol, as illustrated by Equation (2) with methane, as illustrated by Equation (3) with any hydrocarbon $C_nH_m$; and as illustrated by Equation (4) with methanol.

$$CH_4 + H_2O + heat \rightarrow CO + 3H_2; \tag{2}$$

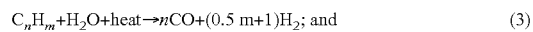
$$C_nH_m + H_2O + heat \rightarrow nCO + (0.5\,m+1)H_2;\ and \tag{3}$$

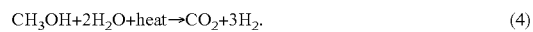
$$CH_3OH + 2H_2O + heat \rightarrow CO_2 + 3H_2. \tag{4}$$

Additional or alternate reforming reactions to take place in the catalytic reforming zone (15a) may include 'vapor-phase' dry reforming of an organic compound, as illustrated by Equation (5) with methane:

$$CH_4 + CO_2 + heat \rightarrow 2CO + 2H_2. \tag{5}$$

The reforming reactions taking place in the reforming zone (15a) are generally endothermic, and thus require input of heat, such as via heat supply (30). Any known configuration may be employed for the reforming zone (15a). For example, a steam reformer generally contains catalyst-filled tubes housed in a furnace. The reforming zone (15a) may contain any suitable steam and/or dry reforming catalyst and is operated at any suitable conditions effective to promote the conversion of an organic compound (such as hydrocarbon, oxygenate, any plurality thereof, or combinations thereof) with steam to hydrogen ($H_2$) and carbon dioxide ($CO_2$).

A suitable catalyst for the catalytic reforming zone (15) comprises a catalytically active metal selected from the group consisting of groups 6, 7, 8, 9, 10 and 11 of the Periodic table (new IUPAC notation).

A suitable steam reforming catalyst preferably comprises at least one metal selected from the group consisting of nickel, ruthenium, iridium, rhodium, platinum, palladium, chromium, copper, and zinc. More preferably a steam reforming catalyst comprises at least one metal selected from the group consisting of nickel, rhodium, chromium, and copper.

A steam reforming catalyst employed for the catalytic reforming zone (15a) may comprise one or more catalytically active components. Suitable catalytically active components for steam reforming catalysts include palladium, platinum, rhodium, iridium, osmium, ruthenium, nickel, chromium, cobalt, cerium, lanthanum, or mixtures thereof. The catalytically active component for steam reforming catalysts may be disposed on a catalyst support such as a ceramic pellet.

The promoting conditions for steam reforming in the catalytic reforming zone (15a) may include a temperature in the range of from about 600° C. to about 1,100° C., or in the range of from about 800° C. to about 1,100° C., or from about 700° C. to about 800° C. The suitable conditions for steam reforming in the catalytic reforming zone (15a) may further include a pressure of from about 507 kPa to about 3040 kPa (from about 5 atm to about 30 atm).

Suitable examples of steam reforming catalysts and reaction promoting systems for the catalytic reforming zone (15a) are disclosed in U.S. Pat. No. 6,881,394 to Keller et al and in U.S. Pat. No. 5,997,594 to Edlund et al.; which are incorporated herein by reference in their entirety. In addition, Harold Gunardson, *Industrial Gases in Petrochemical Processing*, pg. 41-80 (1998), which is incorporated herein by reference in its entirety, provides a discussion of steam reforming. Additional or alternate suitable conditions for operating a steam reforming zone are disclosed in V. R. Choudhary et al., in Catalysis Letters (1995) vol. 32, pg. 387-390; S. S. Bharadwaj & L. D. Schmidt in Fuel Processing Technology (1995), vol. 42, pg. 109-127; and Y. H. Hu & E. Ruckenstein, in Catalysis Reviews—Science and Engineering (2002), vol. 44(3), pg. 423-453, each of which is incorporated herein by reference in its entirety.

Suitable examples of dry reforming catalysts and reaction promoting systems for the reforming zone (15) may be found in Wang et al., *"Carbon dioxide reforming of methane to produce synthesis gas over metal-supported catalysts: State of the Art"*, Energy and Fuels, vol. 10 (1996) pg. 896, (incorporated herein by reference in its entirety). Wang et al have provided a comprehensive summary of many of the catalysts used in the carbon dioxide reforming of methane. Metals from groups 8, 9, 10 of the Periodic Table are generally catalytically active and selective for the dry reforming reaction. Traditionally, nickel-based catalysts have been used because of their low cost, but they tend to be deactivated by the formation of coke. This tendency to coke deposit may be mitigated by an alkali or alkaline earth metal or by passivating the catalyst with sulfur. Also used for dry reforming are bimetallic Ni—Rh catalysts or noble-metal catalysts such as Rh, Ru, Pd, Pt, and Ir. The noble-metal catalysts exhibit high reactivity and low coke formation in dry reforming. The catalytically active metal in dry reforming catalysts may be supported upon a ceramic, a zeolite, or refractory support, such as alumina, magnesium oxide. Examples of supports in dry reforming catalysts include supports comprising alpha alumina, magnesium aluminate, calcium aluminate, or gamma alumina/$CeO_3$ coated on alpha alumina or metal substrates such as FeCr alloy.

Suitable examples of combined dry and steam reforming catalysts and reaction promoting systems for the reforming zone (15) may be found in the following journal articles by Choudhary & Rajput, *"Simultaneous Carbon Dioxide and Steam Reforming of Methane to Syngas over NiO—CaO Catalyst"*, Industrial & Engineering Chemistry Research, vol. 35 (1996) pg. 3934-3939, and by Snoeck & Froment, "Steam/$CO_2$ Reforming of Methane, Carbon Formation and Gasification on Catalysts with Various Potassium Contents", Industrial & Engineering Chemistry Research, vol. 41 (2002) pg. 3548-3556, each which is incorporated herein by reference in its entirety.

The reforming effluent (45) recovered from the catalytic reforming zone (15a) generally comprises $H_2$. The reforming effluent (45) may further comprise carbon dioxide. The reforming effluent (45) may further comprise carbon monoxide. The molar ratio of hydrogen to carbon monoxide ($H_2$:CO) may be at least about 2:3:1, or at least about 2:5:1, or at least about 2:7:1. The reforming effluent (45) may comprise a $H_2$:CO molar ratio of at most about 1,000:1, or at most about 100:1, or at most about 50:1, or at most about 10:1. The reforming effluent (45) may comprise a $H_2$:CO molar ratio between about 2.5:1 and about 5:1, or between about 2:1 and about 4:1, or between about 2.2:1 and about 3:1. Alternatively, the reforming effluent (45) may comprise a $H_2$:CO molar ratio much greater than 10:1, but less than 10,000:1.

Because the vapor-phase reforming reactions in the catalytic reforming zone (15a) such as according to Equations (2) through (5) may not be complete, that is to say, less than 100% conversion on the oxygenates and/or other organic reforming reactant (e.g., components in organic feed 40), the reforming effluent (45) may further comprise unreacted oxygenates or other unreacted organic reforming reactants (e.g., methane, ethane) as well as unreacted inorganic reforming reactants (e.g., $H_2O$ and/or $CO_2$).

The reforming effluent (45) may exit the catalytic reforming zone (15a) at a temperature greater than 700° C. In some embodiments, the reforming effluent (45) may exit from the reforming zone (15a) at a temperature greater than 800° C. Other embodiments include reforming effluent (45) exiting the reforming zone (15a) at a temperature greater than 900° C.

The reforming effluent (45) or a portion thereof may be fed to the WGS zone (20). In some embodiments, the temperature of the reforming effluent (45) is preferably reduced before being fed to the WGS zone (20). The temperature of the reforming effluent (45) may be decreased to any suitable temperature compatible with the operating conditions of the WGS zone (20), preferably to a temperature of at most 600° C., or at most 300° C. In alternative embodiments when reforming effluent (45) has a temperature of 600° C. or less, the temperature of the reforming effluent (45) may not be adjusted before being fed to the WGS zone (20).

In other embodiments (not illustrated), the reforming effluent (45) or a portion thereof may not be directed to WGS zone (20), thus bypassing the WGS zone (20).

The WGS zone (20) comprises a water-gas shift catalyst. The WGS zone (20) is configured to receive at least a portion of the reforming effluent (45) exiting the catalytic reforming zone (15*a*) and further configured to generate a WGS effluent (35). The process for making hydrogen comprises passing at least a portion of the reforming effluent (45) under conversion promoting conditions to convert CO and $H_2O$ to $H_2$ and $CO_2$ (according to Equation (6)) thereby generating the hydrogen-enriched WGS effluent (35) which has a lower CO content and increased $H_2$ and $CO_2$ contents than reforming effluent (45).

  (6)

A WGS water feed (50) may be fed to the WGS zone (20) to assist in the water gas shift reaction. In the WGS zone (20), carbon monoxide and water come in contact with a water-gas shift catalyst for a sufficient amount of time for at least a portion of the carbon monoxide to react with water to produce carbon dioxide and hydrogen as shown in Equation (6).

The WGS water feed (50) may be in liquid form or in vapor form, e.g., steam. Preferably, the WGS water feed (50) is added as steam. The WGS water feed (50) may be mixed with the reforming effluent (45) prior to contact with the water-gas shift catalyst in WGS zone (20). In alternative embodiments (not illustrated), the WGS water feed (50) is mixed with the reforming effluent (45) solely upon contact with the water-gas shift catalyst.

The performance of the WGS zone (20) is preferably independent of the operation of the reforming zone (15*a*). The WGS zone (20) may include a packed bed of water-gas shift catalyst or two or more packed beds of water-gas shift catalysts. The water gas shift catalyst may include a low-temperature catalyst and/or a high-temperature catalyst. The WGS zone (20) can have any suitable operating conditions. Examples of suitable conditions include pressures from about 101 kPa (1 atmosphere) to about 30,400 kPa (about 300 atmospheres). It is to be understood that one skilled in the art would be able to select a suitable operating temperature based on factors such as the water-gas shift catalyst composition, the amount of conversion desired, based on the temperature, pressure and composition of the reforming effluent (45) which is fed to the WGS zone (20).

In embodiments in which the WGS zone (20) comprises a low-temperature catalyst, the WGS zone (20) can be operated at temperatures between about 150° C. and about 300° C. In other embodiments, the WGS zone (20) may be operated at temperatures between about 180° C. and about 260° C. Low-temperature WGS catalysts may include any catalysts suitable for use in the WGS zone (20) under such temperatures. Examples of low-temperature WGS catalysts include copper oxide or copper supported on other transition metal oxides such as zirconia; and/or zinc supported on transition metal oxides or refractory supports such as silica, alumina, zirconia, and the like. In alternative embodiments, low-temperature WGS catalysts include a noble metal such as platinum, rhenium, palladium, rhodium or gold on a suitable support such as silica, alumina, zirconia, and the like. Other examples of low-temperature WGS catalysts include $CuO/ZnO/Al_2O_3$ and $Cu/MgO/Al_2O_3$. In such examples, the low-temperature WGS catalyst may contain from about 25 wt. % to about 60 wt. % CuO The low temperature WGS catalyst may contain from about 25 wt. % to about 55 wt. % ZnO or MgO. In addition, the low temperature WGS catalyst may contain from about 12 wt. % to about 20 wt. % $Al_2O_3$.

In embodiments in which the WGS zone (20) employs a high-temperature WGS catalyst, the WGS zone (20) can be operated at temperatures between about 300° C. and about 600° C. In other embodiments, the WGS zone (20) can be operated at temperatures between about 300° C. and about 550° C. High-temperature WGS catalysts can include any catalysts suitable for use in the WGS zone (20) at such temperatures. Non-limiting examples of high-temperature WGS catalysts include one or more transition metal oxides such as ferric oxide and/or chromic oxide (for example, $Fe_3O_4/Cr_2O_3$), and optionally including a promoter such as copper or iron silicide. Other examples of high-temperature WGS catalysts may include platinum, palladium and/or other platinum group members. $Fe_2O_3/Cr_2O_3/CaO$ is an example of a high-temperature WGS catalyst. In such an example, the high-temperature WGS catalyst has from about 65 wt. % to about 90 wt. % $Fe_2O_3$. The high-temperature WGS catalyst also has from about 7 wt. % to about 9 wt. % $Cr_2O_3$. In addition, the high-temperature WGS catalyst has from about 0 to about 17 wt. % CaO.

In alternate embodiments, the WGS zone (20) may contain a medium-temperature WGS catalyst. The WGS zone (20) then may be operated at temperatures intermediate those described for low-temperature and high-temperature WGS catalysts. Non-limiting examples of medium-temperature WGS catalysts include $CuO/Fe_2O_3/Cr_2O_3$. In such examples, the medium-temperature WGS catalyst has about 90 wt. % $Fe_2O_3$. The medium-temperature WGS catalyst also has about 8 wt. % $Cr_2O_3$. In addition, the medium-temperature WGS catalyst has about 1.5 wt. % CuO.

In other embodiments, the WGS zone (20) may comprise any combination of low-temperature WGS catalysts, medium-temperature WGS catalysts, and/or high-temperature WGS catalysts. In such embodiments, low-temperature WGS catalysts, medium-temperature WGS catalysts, and/or high-temperature WGS catalysts may be arranged in a single catalyst mixture in a single WGS zone (20), or they may arranged in a plurality of water-gas shift reaction zones, for example operated in series or in parallel.

As a non-limiting example of a sequential WGS treatment (not illustrated in FIG. 1), the WGS zone (20) comprises an upstream high-temperature WGS zone and a downstream low-temperature WGS zone. In this example, the reforming effluent (45) is fed to the upstream high-temperature WGS zone to generate a first shifted effluent. The temperature in this upstream WGS zone may be between about 300° C. and about 600° C., or between about 300° C. and about 560° C., which provides suitable conditions for at least a portion of the CO to react with $H_2O$ to form $CO_2$ and $H_2$. Optionally, at least a portion of the $H_2$ is selectively removed from the first shifted effluent. The first shifted effluent is then passed to the downstream low-temperature WGS zone to finally provide the WGS effluent (35). In the downstream low-temperature WGS zone, the temperature may be between about 150° C. and about 300° C., or between about 180° C. and about 260° C., which provides suitable conditions for some of or substantially all of the remaining CO (unreacted from the upstream high-temperature WGS zone) to react with $H_2O$ to form $CO_2$ and $H_2$.

In some additional or alternate embodiments (not illustrated), a hydrogen removal process can be performed between sequential water-gas shift reaction zones, for example by operating two water-gas shift zones in separate vessels in series and providing a selective hydrogen removal unit which is configured to receive the shifted effluent from the upstream WGS zone and configured to provide a hydrogen-lean feed to the downstream WGS zone.

In some alternate embodiments (not illustrated), a hydrogen removal process can be performed on the effluent streams from two or more WGS zones operated in parallel, for example by operating various WGS zones in separate vessels and providing a selective hydrogen removal unit which is configured to receive pooled shifted WGS effluents from these separate vessels and configured to generate a hydrogen-lean stream and a hydrogen-rich stream. The hydrogen-rich stream may be directed to hydrogen users within a CTL plant, while the hydrogen-lean stream may be used as fuel in the CTL plant.

The WGS zone (20) can be operated to achieve any desired hydrogen yield. In some examples, the WGS zone (20) can convert more than 90% of CO to $CO_2$. In other examples, the WGS zone (20) can convert more than 95% of CO to $CO_2$. Further examples include the WGS zone (20) having a CO to $CO_2$ conversion of 99% or greater.

The WGS zone (20) thus produces hydrogen-rich WGS effluent (35) which may contain any amount of CO, preferably a low amount of CO (e.g., less than 500 ppm CO, or less than 100 ppm CO, or less than 50 ppm CO).

The hydrogen-rich WGS effluent (35) may have a $H_2$:CO molar ratio from about 4:1 to about 10,000:1, or from about 5:1 to about 5,000:1, or from about 10:1 to about 1,000:1, or from about 25:1 to about 100:1, or from about 30:1 to 50:1.

Although not illustrated, system (1a) may further include a carbon dioxide removal unit in which a portion of or all of the carbon dioxide present in the hydrogen-rich WGS effluent (35) may be removed. The carbon dioxide in hydrogen-rich WGS effluent (35) can be removed by any suitable method. Non-limiting examples of a suitable method for removing carbon dioxide include amine scrubbing and/or pressure swing adsorption.

Hydrogen-rich WGS effluent (35) or a portion thereof (35a) may be used as fuel to supply heat via heat supply (30) to the steam generator (10) in order to generate steam (25) from the process feed water (5). In alternative embodiments, the hydrogen-rich WGS effluent (35) is not used as fuel to supply heat to the steam generator (10).

Unless stated otherwise, any description of a unit or stream with respect to a drawing is applicable to the same labelled unit or stream in another drawing.

Figure 2:
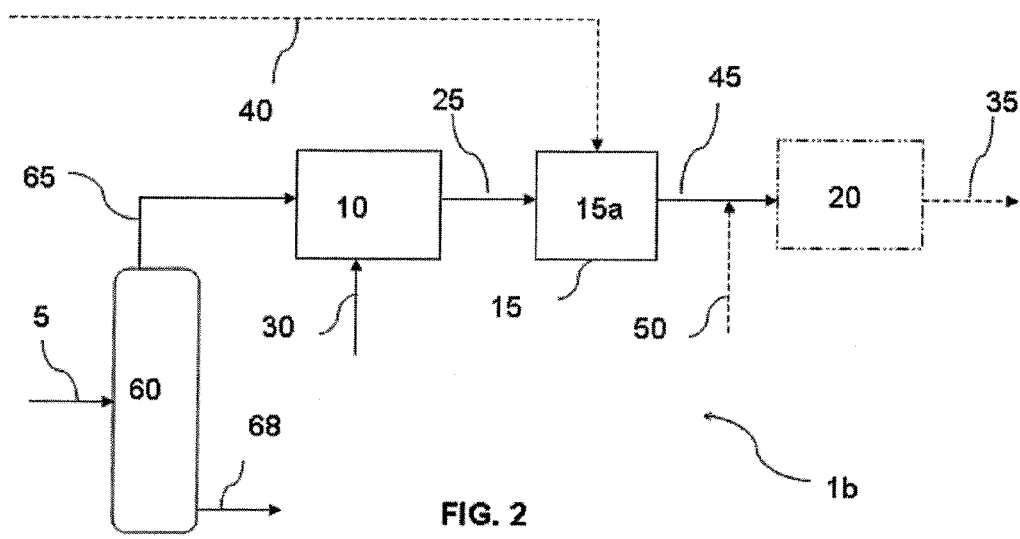
FIG. 2 illustrates a second embodiment of a system (1b) for making hydrogen and optionally carbon monoxide which comprises a distillation unit for oxygenates recovery for generating an oxygenates-rich steam, a steam generator, a reforming zone, and a water-gas shift zone.

FIG. 2 illustrates another embodiment of a system (1b) which is similar to system (1a) of FIG. 1, except that the system (1b) further comprises a unit for treatment of process water feed (5) via an equilibrium staged separation unit illustrated as distillation unit (60).

The treatment is carried out prior to supplying process water feed (5) to reforming zone (15a) and proceeds as follows. The process water feed (5) is fed to the distillation unit (60) to generate an oxygenates-rich stream (65) in the overheads of the distillation unit (60) and a water-enriched stream (68) at the bottoms of the distillation unit (60). The oxygenates-rich stream (65) is then fed to the steam generator (10) to provide steam product (25) at a temperature and pressure which is suitable for the reforming zone (15a).

The description of the units or zones (10, 15, and 20) illustrated in FIG. 1 and of their respective conditions of operations is applicable to the same labeled units or zones (10, 15, and 20) in FIG. 2. Additionally, the compositions and characteristics of streams (25, 35, 40, 45, and 50) described for FIG. 1 are applicable to the same streams (25, 35, 40, 45, and 50) in FIG. 2.

Process water feed (5) may be treated by fractionation or distillation, before being fed to reforming zone (15a). In some embodiments (not illustrated), process water feed (5) is preheated before being fed to distillation unit (60). For example, process water feed (5) may be heated to a temperature of at least 100° F. (37.8° C.), and/or not more than 300° F. (149° C.). The temperature of the heated process water feed (5) may be at least 130° F. (54.4° C.), or at least 170° F. (76.7° C.), and may be at most 275° F. (135° C.), or at most 250° F. (211° C.). In some embodiments, the temperature of the heated process water feed (5) may be between about 150° F. (65.6° C.) and about 300° F. (149° C.), or between about 170° F. (76.7° C.) and about 250° F. (211° C.).

Distillation unit (60) may be any unit suitable for separating oxygenates (and optionally non-oxygenated hydrocarbons) from water. The distillation unit (60) may comprise a fractionation column with trays or a packed column with random packing column, or any other suitable column for producing oxygenates-enriched stream (65). In some embodiments, distillation unit (60) comprises a distillation column operated under suitable conditions to separate a portion of the water and oxygenates.

The distillation unit (60) may be operated at any conditions suitable for producing the oxygenates-rich stream (65) and water-enriched stream (68). For instance, suitable conditions for operation of distillation unit (60) may include a temperature of at least 100° F. (37.8° C.), or at least 150° F. (65.6° C.), or at least 200° F. (96.3° C.). In additional or alternate embodiments, suitable conditions for operation of distillation unit (60) may include a temperature of at most 300° F. (149° C.), or at most 290° F. (143° C.), or at most 280° F. (138° C.). In some embodiments, the temperature during operation of distillation unit (60) may be between about 100° F. (37.8° C.) and about 300° F. (149° C.), or between about 200° F. (143° C.) and about 280° F. (138° C.). In addition, suitable conditions for operation of distillation unit (60) may include a pressure of at least 101 kPa (0 psig), or at least about 170 kPa (10 psig), or at least about 205 kPa (15 psig). In additional or alternate embodiments, suitable conditions for operation of distillation unit (60) may include a pressure of at most about 515 kPa (60 psig), or at most about 412 kPa (45 psig), or at most about 308 kPa (30 psig). In some embodiments, the pressure during operation of distillation unit (60) may be between about 101 kPa (0 psig) and about 515 kPa (60 psig), or between about 205 kPa (15 psig) and about 308 kPa (30 psig).

Oxygenates-rich stream (65) exiting distillation unit (60) is leaner in water content and enriched in oxygenates content compared to process water feed (5). Oxygenates in oxygenates-rich stream (65) may comprise non-acidic oxygenates. In some cases, oxygenates in oxygenates-rich stream (65) may consist essentially of non-acidic oxygenates, i.e., more than 98% of the oxygenates in oxygenates-rich stream (65) are non-acidic oxygenates. Alternatively or additionally, oxygenates-rich stream (65) may be leaner in acidic oxygenates compared to process water feed (5). In some cases, oxygenates-rich stream (65) is substantially free of acidic oxygenates (i.e., less than 0.01 wt. % acidic oxygenates).

Oxygenates-rich stream (65) may comprise at most 80 wt. % water, or at most 70 wt. % water, or at most 60 wt. % water. In some embodiments, the oxygenates-rich stream (65) comprises between about 5 wt. % and about 70 wt. % water, or between about 10 wt. % and about 60 wt. % water, or between about 15 wt. % and about 50 wt. % water, or between about 20 wt. % and about 40 wt. % water. Oxygenates-rich stream (65) also comprises at least 2 wt. % organic content, or at least 5 wt. %, or at least 10 wt. %, or at least 20 wt. %. Oxygenates-rich stream (65) also comprises at most 95 wt. % organic content, or at most 90 wt. %, or at most 85 wt. %. Oxygenates-rich stream (65) may comprise between about 5 wt. % and about 95 wt. % organics, or between about 10 wt. % and about 90 wt. % organics, or between about 50 wt. % and about 85 wt. % organics, or between about 60 wt. % and about 80 wt. % organics.

Water-enriched stream (68) exiting distillation unit (60) is richer in water content and leaner in oxygenates content than process water feed (5). Water-enriched stream (68) may comprise acidic oxygenates, and in some cases may be enriched in acidic oxygenates compared to process water feed (5). Water-enriched stream (68) may comprise at least 90 wt. % water, or at least 95 wt. % water, or at least 98 wt. % water. Water-enriched stream (68) may comprise at most 99.9 wt. % water, or at most 99.9 wt. % water, or at most 99.8 wt. % water, or at most 99.7 wt. % water.

In some embodiments (not illustrated in FIG. 2), water-enriched stream (68) may be fed to an acidic oxygenates recovery process. A suitable example for acidic oxygenates recovery from Fischer-Tropsch reaction water is described in U.S. Pat. No. 7,150,831 by Dancuart Kohler et al, the disclosure of which is incorporated herein by reference in its entirety. Water-enriched stream (68) may be fed to a wastewater biological treatment facility for further purification such as further removal of remaining organic matter.

The use of distillation unit (60) for the treatment of process water feed (5) may offer several advantages: 1/an increase in oxygenates content for the water source supplying the steam generator (10); 2/the selective or complete removal of acidic oxygenates from the water source supplying the steam generator (10); or in combination 3/an increase in non-acidic oxygenates content and a decrease in acidic oxygenates content for the water source supplying the steam generator (10).

Figure 3:
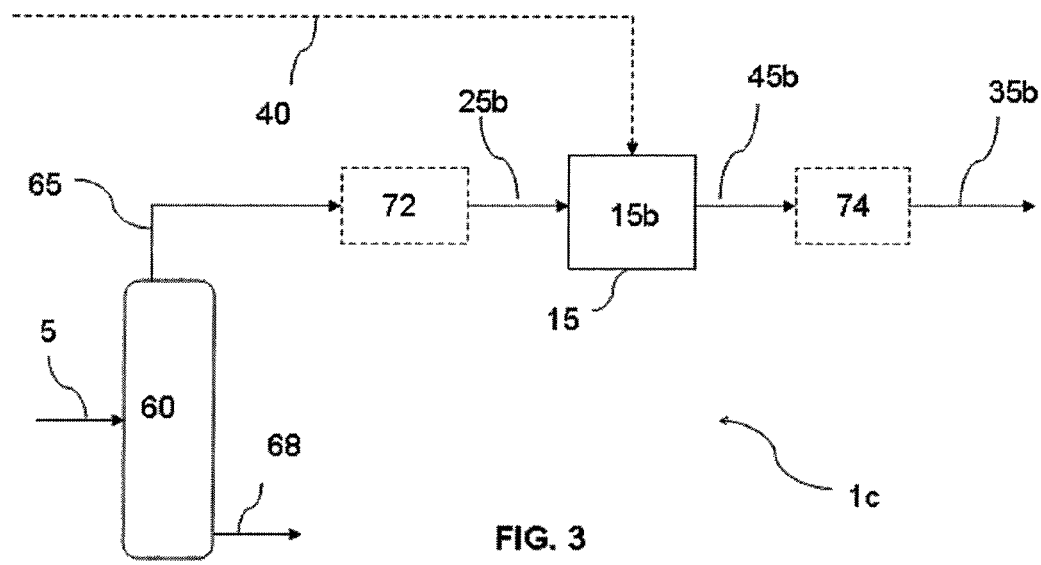
FIG. 3 illustrates a third embodiment of a system (1c) for making hydrogen and optionally carbon dioxide which comprises a distillation unit for oxygenates recovery for generating an oxygenates-rich steam and a liquid-phase reforming zone, an optional adjustment unit and an optional purification system.

FIG. 3 illustrates an alternate embodiment of a system (1c) for making hydrogen and carbon dioxide. Similarly to system (1b) of FIG. 2, the system (1c) of FIG. 3 employs an equilibrium staged separation, e.g., distillation column (60), for a similar treatment of the process water feed (5) as illustrated in FIG. 2. But contrary to the system (1b) of FIG. 2 which comprises a catalytic reforming zone (15a) operating in vapor phase, the syngas generator (15) in system (1c) of FIG. 3 comprises a liquid-phase reforming zone (15b), an optional adjustment unit (72) and an optional enrichment unit (74). Additionally the system (1c) in FIG. 3 does not require (or excludes) a steam generator and a WGS zone (which have been described previously in the context of FIG. 1 and also used in FIG. 2).

The liquid-phase reforming zone (15b) may contain any suitable aqueous-phase reforming catalyst and is operated at any suitable conditions effective to promote the conversion of at least one oxygenate to hydrogen ($H_2$) and carbon dioxide ($CO_2$). Examples of catalysts and operating conditions suitable for aqueous-phase reforming of oxygenates may be found in articles by Dumesic and coworkers at the University of Wisconsin (U.S.A.). For example Davda et al "*A review of catalytic issues and process conditions for renewable hydrogen and alkanes by aqueous-phase reforming of oxygenated hydrocarbons over supported metal catalysts*", Applied Catalysis B: Environmental vol. 56 (2005) pg. 171-186 (incorporated herein by reference in its entirety) have provided a comprehensive summary of catalysts and operating conditions used in the aqueous-phase reforming of methanol and glycerol.

Adjustment unit (72) may include a temperature-adjustment unit (such as cooling or heating unit, heat-exchanger) or a pressure-adjustment unit (such as compressor or expander).

Purification system (74) may include, for example, a pressure-swing adsorption or a membrane separation unit for the selective separation of hydrogen from other components of reforming effluent (45b). Examples of hydrogen selective purification may be found in an article by Adhikari and Frenando (2006) "*Hydrogen Membrane Separation Techniques*", Industrial & Engineering Chemistry Research, vol. 45 (2006) pg. 875-881, as well as in U.S. Pat. No. 5,782,960 by Ogawa et al; U.S. Pat. No. 6,527,833 by Oyama et al; U.S. Pat. No. 7,125,440 by Bossard et al, each of which is incorporated herein by reference in its entirety.

The operation of system (1c) is as follows. Process water feed (5) is fed to distillation unit (60) to generate oxygenates-rich stream (65) and water-enriched stream (68). The oxygenates-rich stream (65) may be sent to optional adjustment unit (72). The resulting stream (25b) exiting the adjustment unit (72) is fed to the liquid-phase reforming zone (15b) of syngas generator (15). In this instance, the resulting stream (25b) is an oxygenates-rich stream which provides oxygenates (as an organic reforming reactant) and water (as an inorganic reforming reactant) to the reforming zone (15b). To provide another organic reforming reactant to the reforming zone (15b), the organic feed (40) may also be fed to the reforming zone (15b). In this instance, the resulting stream (25b) is an oxygenates-rich stream which provides a portion of oxygenates (as a first organic reforming reactant) and water (as an inorganic reforming reactant) to the reforming zone (15b), while the organic feed (40) may provide a second organic reforming reactant to the reforming zone (15b). The conditions of operations of reforming zone (15b) are promoting the conversion of oxygenates via liquid-phase aqueous reforming to form hydrogen and $CO_2$.

A reforming effluent (45b) is formed and exits the reforming zone (15b). Reforming effluent (45b) comprises hydrogen and $CO_2$, but may further comprise CO and unreacted oxygenates and unreacted components of optional organic feed (40). The reforming effluent (45b) may be further passed through optional purification system (74), where hydrogen may be selectively extracted from the rest of reforming effluent (45b), and/or where $CO_2$ may be removed from the rest of reforming effluent (45b) via known processes (such as amine scrubbing, water gas shift and/or pressure swing_absorption)

Purified stream (35b) exiting purification system (74) thus may be enriched in hydrogen compared to reforming effluent (45b). The purified stream (35b) may alternatively or additionally be leaner in $CO_2$. Purified stream (35b) may comprise greater than about 80 vol. % by volume $H_2$, or greater than about 85% vol. % $H_2$, or greater than about 90% vol. % $H_2$. Purified stream (35b) can be used to meet various hydrogen needs in a CTL plant to supply units with hydrogen. Another stream containing components other than $H_2$ may exiting unit (74) (not illustrated) and may be used as fuel in various units of a CTL plant, such as preheaters and/or gas turbines. Examples of suitable preheaters may include a hydrocarbon synthesis reactor preheater, a product fractionator preheater, and a hydrocarbon synthesis product upgrading preheater. An example of a gas turbine is one that is employed to generate electricity for a CTL plant.

Figure 4:
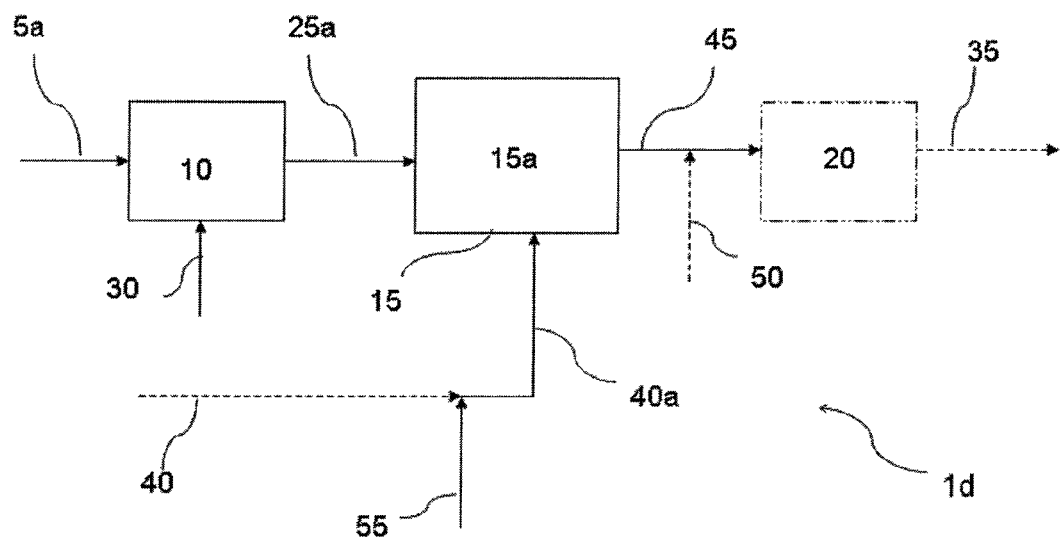
FIG. 4 illustrates a fourth embodiment of a system (1*d*) for making for making hydrogen and optionally carbon monoxide which comprises a steam generator, a reforming zone, and a water-gas shift zone, and for which the steam reforming zone receives steam generated by the steam generator as well as an oxygenates-rich stream.

FIG. 4 illustrates an alternate embodiment of a system (1d) for making hydrogen and optionally CO. The system (1d) of FIG. 4 is similar to system (1a) of FIG. 1, except that an oxygenates-rich stream (55) is fed to the catalytic reforming zone (15a) either directly (not-illustrated) or indirectly (illustrated) via a combined stream (40a) with optional organic feed (40).

The oxygenates-rich stream (55) comprises oxygenates and may comprise at most 90 wt. % water, at most 80 wt. % water, at most 70 wt. % water, at most 50 wt. % water. The content in oxygenates of the oxygenates-rich stream (55) may be at least 10 wt. %, or at least 20 wt. %, or at least 30 wt. %, or at least 50 wt. %. The oxygenates content in the process water feed (5) may be at most 90 wt. %, or at most 80 wt. %, or at most 70 wt. %. In some embodiments, the oxygenates content in the oxygenates-rich stream (55) may be between 50 wt. % and 90 wt. %, or between 60 wt. % and 80 wt. %.

As illustrated in FIG. 4, the oxygenates-rich stream (55) and optional organic feed (40) may be combined to form mixed feedstream (40a) before being fed to the catalytic reforming zone (15a). However, it should be noted (although not illustrated) that the oxygenates-rich stream (55) and the optional organic feed (40) may be fed separately to the catalytic reforming zone (15a).

In some embodiments, the oxygenates-rich stream (55)— or combined stream (40a)—may supply oxygenates (as a first organic reforming reactant) and a second organic reforming reactant to the reforming zone (15a), while steam product (25a) supplies steam (as an inorganic reforming reactant) to the reforming zone (15a). The second organic reforming reactant may be selected from the group consisting of a $C_1$-$C_5$ hydrocarbon, a mixture of $C_1$-$C_5$ hydrocarbons, an alcohol, a mixture of alcohols, and combinations thereof.

In other embodiments, steam product (25a) may supply steam (as an inorganic reforming reactant) to the reforming zone (15a), while the oxygenates-rich stream (55)—or combined stream (40a)—may supply oxygenates (as organic reforming reactant) and either steam or another (second) inorganic reforming reactant to the reforming zone (15a). The inorganic reforming reactant supplied by the oxygenates-rich stream (55) may be selected from the group consisting of steam, $CO_2$, and combinations thereof.

Referring again to FIG. 4, water feed (5a) is fed to steam generator (10) in order to form steam product (25a) which is fed at least in part to the reforming zone (15a). The water feed (5a) may contain oxygenates; but preferably, the water feed (5a) is substantially free of organic matter (e.g., less than 0.01 wt. % organics). In additional or alternative embodiments, the water feed (5a) may include a freshwater source, such as rainwater or water from a lake or river. It should be noted that the water feed (5a) may comprise some purified water from a wastewater biological treatment facility. Preferably, the content in freshwater and purified water in the water feed (5a) is large (e.g., more than 99 wt. %). In some embodiments, the water feed (5a) consists essentially of freshwater, purified water or combination thereof.

The pressure and temperature as described for steam product (25) in reference to FIG. 1 are equally applicable here to steam product (25a). However, steam (25a) in system (1d) of FIG. 4 generally differs from steam product (25) described earlier in reference to system (1a) of FIG. 1, in that the organic content of steam product (25a) is lower than that of steam product (25) or is even nil. Because of the very low organic content of water feed (5a), the organic content of the generated steam product (25a) is also very low or nil. Preferably, steam product (25a) is substantially free in organics (e.g., contains less than 0.01 wt. % organics).

Steam product (25a) and combined stream (40a) are converted into reforming zone (15a) to form the reforming effluent (45) which is then converted in the WGS zone (20) to form the WGS effluent (35). The conversion in reforming zone (15a) and in WGS zone (20) proceeds under the conversion promoting conditions as previously described in reference to the same zones in FIG. 1.

Figure 5:
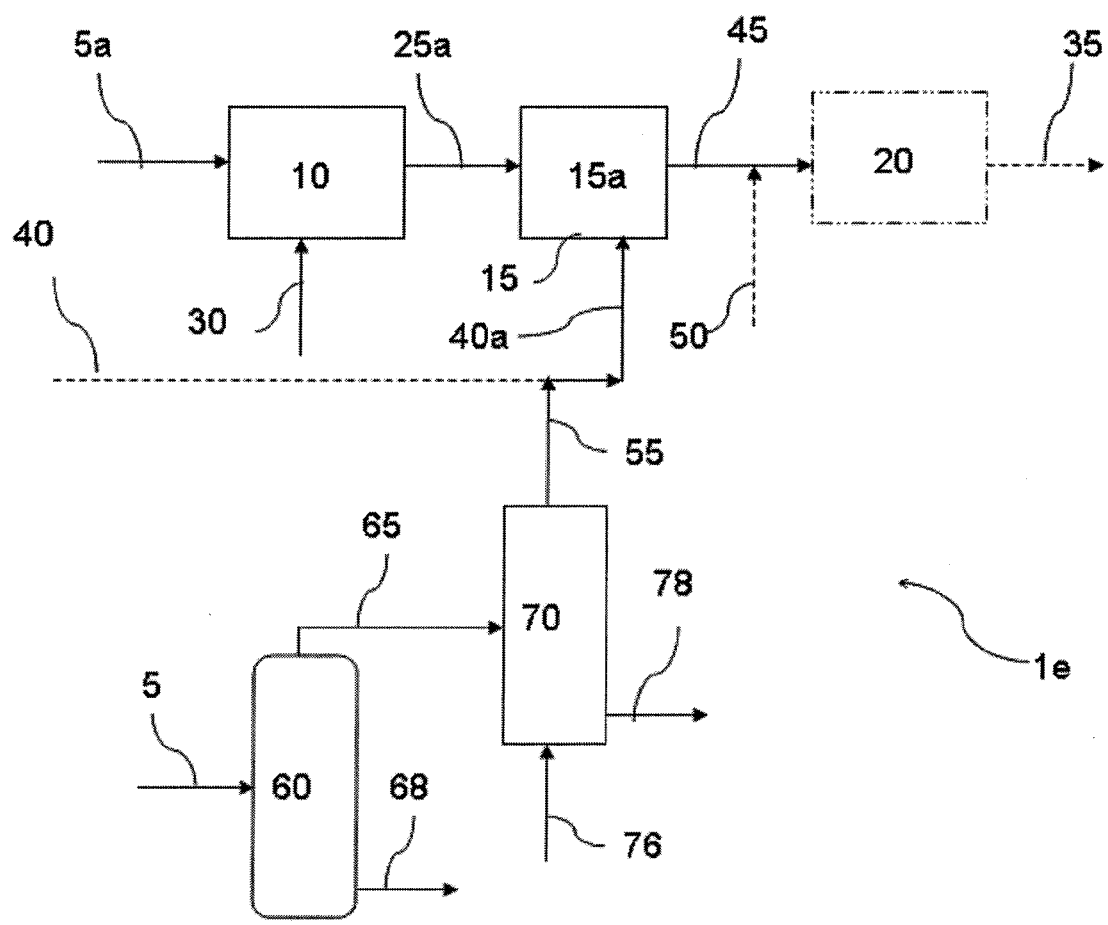
FIG. 5 illustrates a fifth embodiment of a system (1*e*) for making for making hydrogen and optionally carbon monoxide, which comprises a steam generator, a distillation unit for oxygenates recovery, a stripping unit for generating an oxygenates-rich steam, a reforming zone, and a water-gas shift zone.
Figure 6:
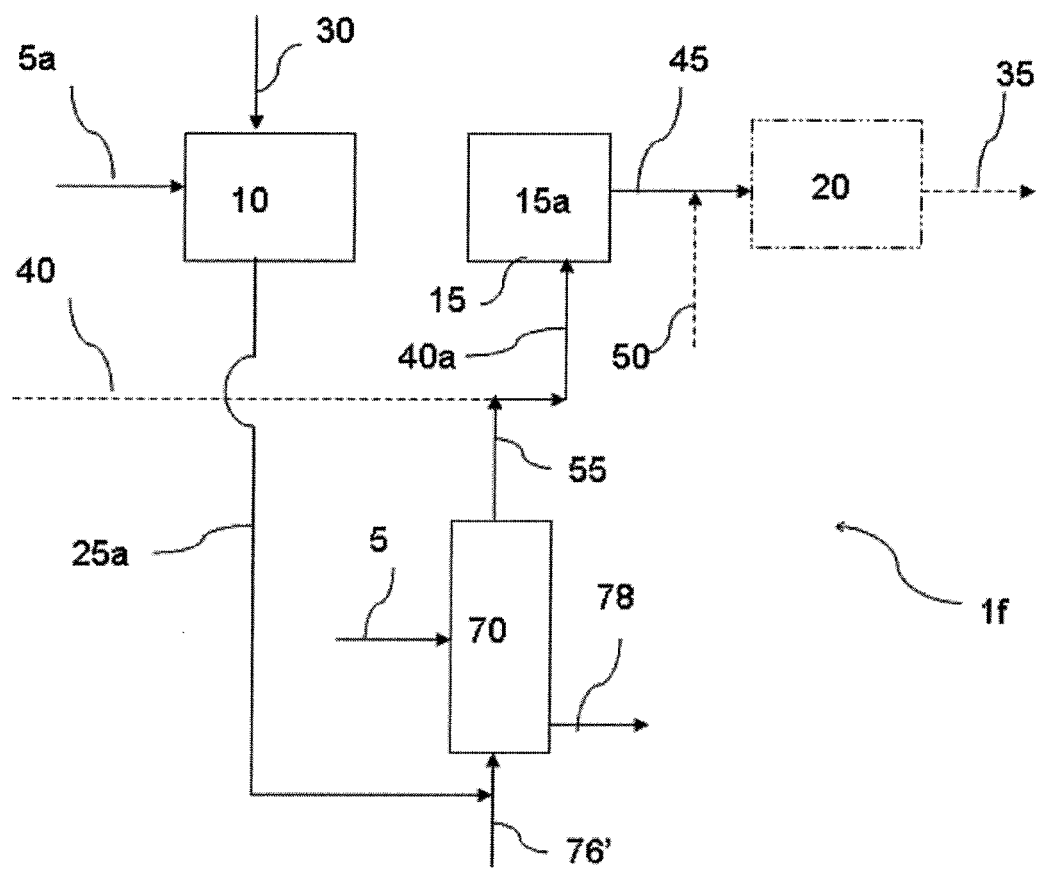
FIG. 6 illustrates a sixth embodiment of a system (1*f*) for making hydrogen and optionally carbon monoxide, which comprises a steam generator, a stripping unit for generating an oxygenates-rich steam, a reforming zone, and a water-gas shift zone.

FIGS. 5 and 6 illustrate two embodiments on how to form the oxygenates-rich stream (55) which is illustrated in system (1d) in FIG. 4 and which supplies the reforming zone (15a) in oxygenates originating from a hydrocarbon synthesis product water.

Particularly, FIG. 5 illustrates a system (1e) for making hydrogen and optionally CO which includes the system (1d) of FIG. 4 and further comprises a distillation unit (60) and a stripping unit (70). The oxygenates-rich stream (55) is provided by sequential distillation and stripping of the process water feed (5) in these two units.

The operation of distillation (60) is similar to that of the operation of distillation unit (60) in reference to FIG. 2, in that the process water feed (5) which comprises oxygenates passes through distillation unit (60) where its components are separated to form the oxygenates-rich stream (65) at the distillation overhead and the water-enriched stream (68) at or near the distillation bottom.

The oxygenates-rich stream (65) (which may also be called 'oxygenates overhead stream') is further passed through stripping unit (70) into which a stripping fluid (76) is injected at or near the bottom of the stripping unit (70) and acts as a stripping agent. As the stripping fluid (76) moves through the stripping unit (70), it displaces by absorption some of or most of the oxygenates passing generally in countercurrent but not necessarily through the stripping unit (70). The stripping fluid (76) thus carries the absorbed oxygenates out of the stripping unit (70) and exits stripping unit (70) to form the oxygenates-rich stream (55).

The stripping fluid (76) is preferably in gaseous form when it enters the stripping unit (70). The stripping fluid (76) preferably comprises a reforming reactant. The stripping fluid (76) may comprise an organic reforming reactant, for example, natural gas or at least a $C_1$-$C_5$ hydrocarbon component of natural gas such as methane or ethane. The stripping fluid (76) may comprise at least 50 wt. % methane, or at least 80 wt. % methane. In some embodiments, the stripping fluid (76) may comprise between about 75 wt. % and about 98 wt. % methane, alternatively between about 80 wt. % and about 95 wt. % methane. The stripping fluid (76) may comprise at least 50 wt. % ethane, or at least 80 wt. % ethane. In some embodiments, the stripping fluid (76) may comprise between about 75 wt. % and about 99.5 wt. % ethane, alternatively between about 80 wt. % and about 99 wt. % ethane. In alternate embodiments, the stripping fluid (76) may comprise methane and ethane. For example, the stripping fluid (76) may be a natural gas stream or a fraction thereof.

Alternatively or additionally, the stripping fluid (76) may comprise an inorganic reforming reactant, such as steam, carbon dioxide, or combinations thereof. When the stripping fluid (76) comprises steam, it is envisioned (although not illustrated) that a part of steam product (25) generated by steam generator (10) may be used to provide steam in the stripping fluid (76).

The conditions of operations of the various units or zones (10, 15a, 20) which were previously described in reference to FIG. 1 are applicable to the same units or zones (10, 15a, 20) of FIG. 5. Additionally, the compositions and characteristics of streams (35, 40, 45, 50) previously described in reference to FIG. 1 are applicable to the same streams (35, 40, 45, 50) in FIG. 5. The compositions and characteristics of streams (5a, 25a, 40a, 55) previously described in reference to FIG. 4 are applicable to the same streams of FIG. 5.

FIG. 6 illustrates a system (1f) for making hydrogen or synthesis gas which includes the system (1d) of FIG. 4 and further comprises a stripping unit (70). The oxygenates-rich stream (55) is provided by stripping oxygenates off the process water feed (5) in this unit.

The operation of stripping unit (70) in FIG. 6 is similar to that of the unit (70) previously described in reference to FIG. 5, except that process water feed (5) is fed directly to the stripping unit (70) without first being enriched through an equilibrium staged separation, such as distillation. The process water feed (5) which comprises oxygenates is passed through the stripping unit (70) while the stripping fluid (76) is injected at or near the bottom of the stripping unit (70) to form the oxygenates-rich stream (55) and water stream (78). As the stripping fluid (76) proceeds through the stripping unit (70), the stripping fluid absorbs some of or most of the oxygenates passing through the stripping unit (70), generally in counter-current although not necessarily. The stripping fluid (76) thus carries the absorbed oxygenates out of the stripping unit (70) to form the oxygenates-rich stream (55) which exits the stripping unit (70).

Water feed (5a) is fed to steam generator (10) to form generate product (25a). Water feed (5a) may contain oxygenates; but preferably, the water feed (5a) is substantially free of organic matter (e.g., less than 0.01 wt. % organics). In additional or alternative embodiments, the water feed (5a) may include freshwater, purified water from a wastewater biological treatment facility, or combination thereof. In preferred embodiments, the water feed (5a) consists essentially of freshwater, purified water, or combination thereof.

The stripping fluid (76) fed to unit (70) in FIG. 6 may comprise an inorganic reforming reactant, such as steam, carbon dioxide, or combinations thereof. As illustrated in FIG. 6, the stripping fluid (76) or a portion thereof is provided by at least a portion of the steam product (25a) generated by steam generator (10).

The oxygenates-rich stream (55) exiting the striping unit (70) is then fed to the reforming zone (15a). The operation of reforming zone (15a) and WGS zone (20) in FIG. 6 is similar to that of the same zones previously described in reference to FIG. 1.

Figure 9:
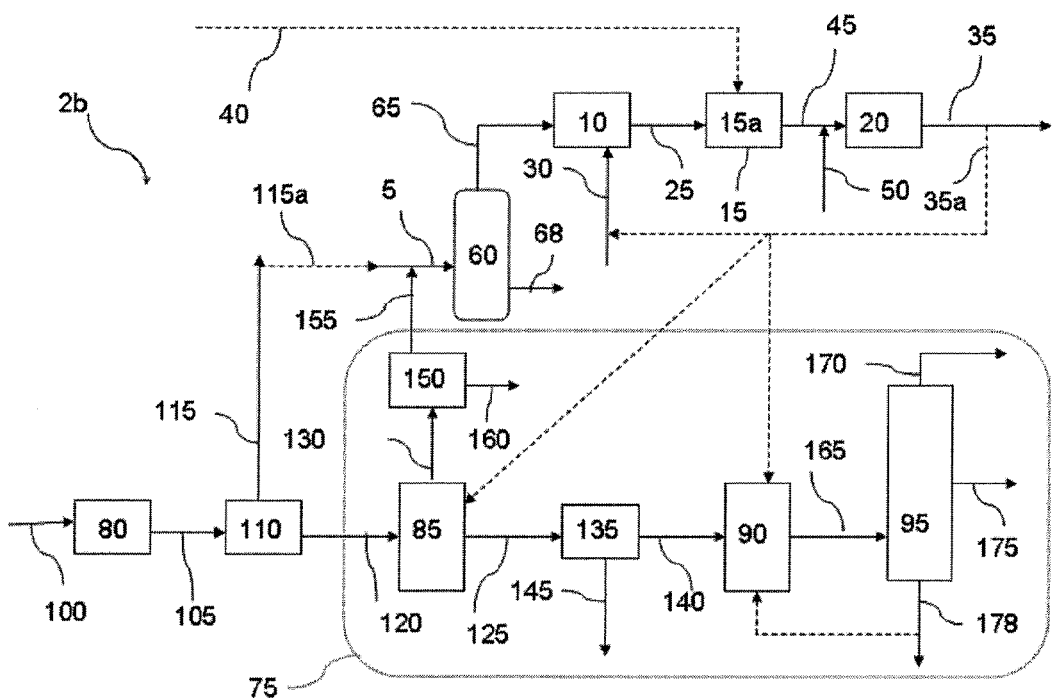
FIG. 9 illustrates a second embodiment of a CTL plant (2*b*) which comprises a first syngas generator, a hydrocarbon synthesis process, and the system (1*b*) of FIG. 2 comprising a distillation unit for generating an oxygenates-rich steam and a second syngas generator containing a reforming zone.
Figure 10:
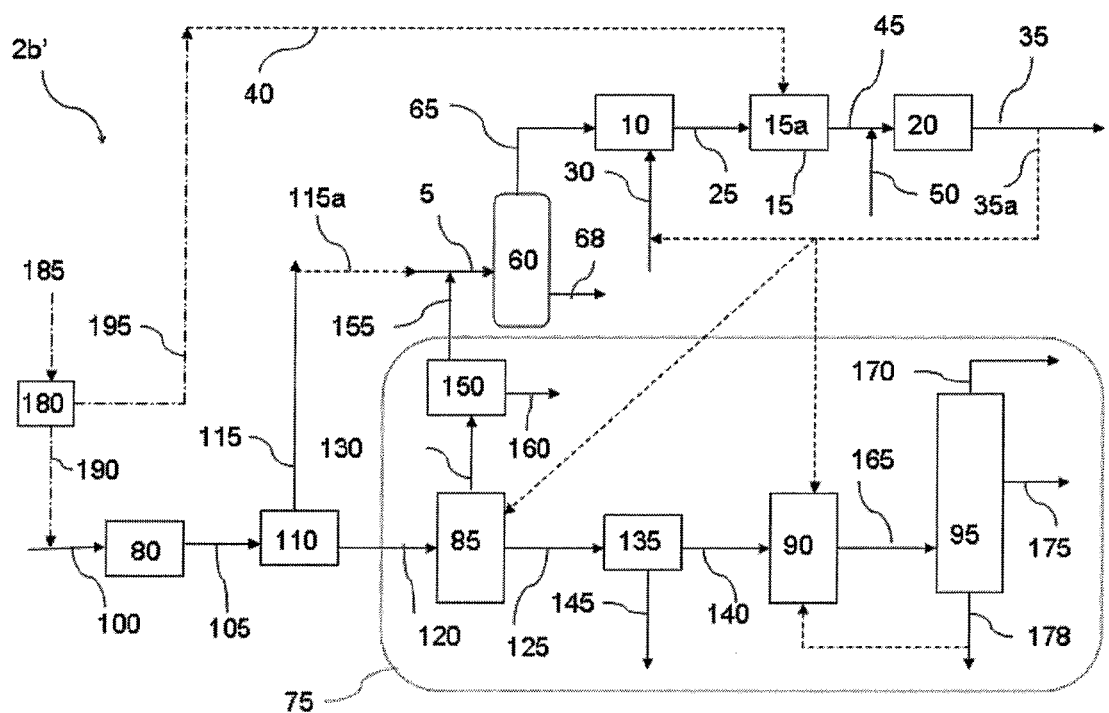
FIG. 10 illustrates an alternate second embodiment of a CTL plant (2*b*') which comprises the CTL plant (2*b*) of FIG. 9 and further comprises a gas plant.
Figure 11:
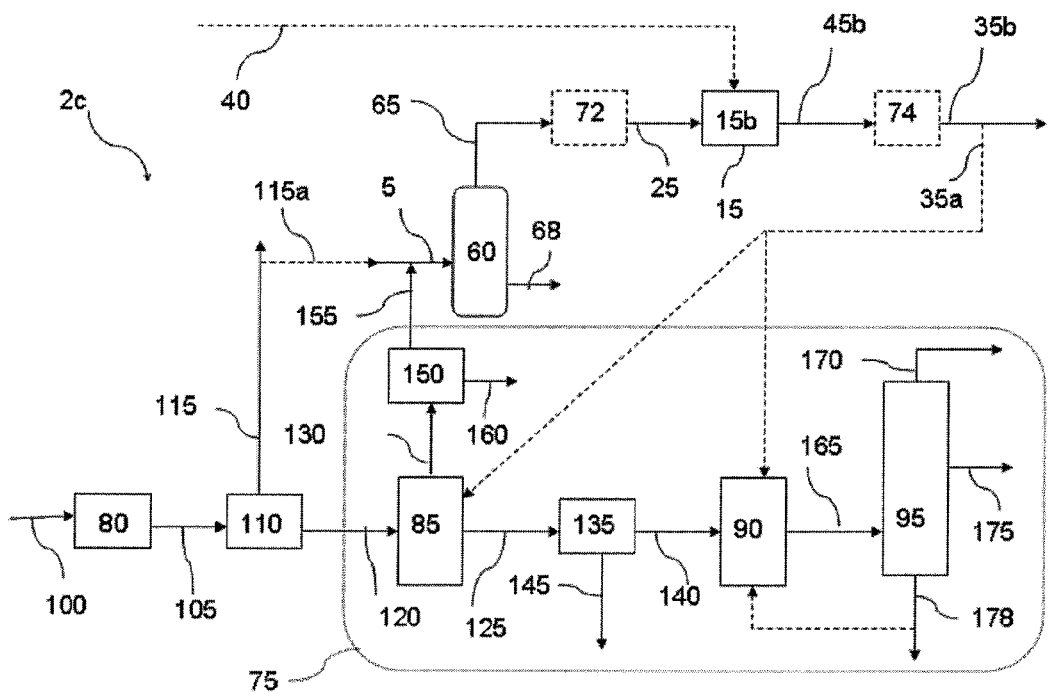
FIG. 11 illustrates a third embodiment of a CTL plant (2*c*) which comprises a first syngas generator, a hydrocarbon synthesis process, and the system (1*c*) of FIG. 3 comprising a distillation unit for generating an oxygenates-rich steam and a second syngas generator containing a liquid-phase reforming zone.

Plants and Processes for Producing Synthetic Hydrocarbons, Hydrogen and Optionally CO FIG. 7-14 illustrates various embodiments of a second aspect of the present invention related to CTL plants and processes for producing synthetic hydrocarbons, oxygenates, water, hydrogen and optionally CO. Each of the CTL plants illustrated in FIG. 7-14 comprises a first syngas generator (80), a water separator (110), and a hydrocarbon synthesis process (75) and further integrates at least one system for producing $H_2$ from FIG. 1-6 which comprises a second syngas generator (15) including a vapor-phase reforming zone (15a), as illustrated in FIGS. 7-10 & 12-14, or including a liquid-phase reforming zone (15b), as illustrated in FIG. 11. The CTL plants (2a; 2a') of FIG. 7-8 integrate the system (1a) of FIG. 1. The CTL plants (2b; 2b') of FIG. 9-10 integrate the system (1b) of FIG. 2. The CTL plant (2c) of FIG. 11 integrates the system (1c) of FIG. 3. The CTL plants (2e; 2e') of FIG. 12-13 integrate the system (1e) of FIG. 5. The CTL plant (2f) of FIG. 14 integrates the system (1f) of FIG. 6.

The first and second syngas generators (80) and (15) in these CTL plants are operated in parallel, that is to say, the syngas effluent exiting from one syngas generator is not fed to the other syngas generator.

Steam generator (10), reforming zone (15a), distillation column (60), stripping unit (70), and WGS zone (20) and their operating conditions have been previously described in reference to various systems (1a, 1b; 1e; 1f) of FIGS. 1-2 & 5-6, respectively, and are applicable for the same units in FIGS. 7-10 & 12-14.

Similarly, reforming zone (15b), distillation column (60), adjustment unit (72) and purification unit (74) and their operating conditions have been previously described in reference to the system (1c) of FIG. 3 and are applicable for the same units in FIG. 11.

Referring to all CTL plants (2a; 2a', 2b; 2b', 2c, 2e; 2e', 2f) of FIG. 7-14 respectively, hydrocarbon synthesis process (75) is configured to receive at least a portion of a syngas stream (120) which may be indirectly provided from the first syngas generator (80) via water separator (110). Hydrocarbon synthesis process (75) preferably includes a hydrocarbon synthesis reactor (85), product upgrading unit (90) and product separation units, such as a product fractionator (95), a liquid product separation unit (135), and a product water recovery unit (150). The hydrocarbon product upgrading in unit (90) may be carried out by thermal cracking or by hydroprocessing, such as hydroisomerization, hydrocracking, hydrotreating, or any combinations thereof.

In alternate or additional embodiments, the hydrocarbon synthesis process (75) may include an oxygenate synthesis reactor, such as a syngas-to-methanol and/or dimethyl ether synthesis. In additional or alternate embodiments, the hydrocarbon synthesis reactor (85) comprises a Fischer-Tropsch synthesis reactor, which converts syngas to water, hydrocarbons and oxygenates. Hydrocarbon synthesis reactor (85) may alternatively or additionally comprise a syngas to gasoline process including an intermediate synthesis from syngas to methanol and/or dimethyl ether.

In the CTL process operated in the various CTL plants (2a; 2a', 2b; 2b', 2c, 2e; 2e', 2f) of FIG. 7-14, the process for making synthetic hydrocarbons, water and oxygenates proceeds as follows. A carbonaceous feed stream (100) is supplied to the first syngas generator (80) where it is converted to a syngas effluent (105) which generally comprises hydrogen and carbon monoxide.

Feed stream (100) may comprise one hydrocarbon or mixture of hydrocarbons such as natural gas, one or more components of material gas such as methane, or a solid carbonaceous material such as biomass, tar sand, coke, and/or coal. Feed stream (100) preferably comprises at least one light $C_1$-$C_5$ hydrocarbon such as methane or a mixture of light hydrocarbons, such as natural gas.

First syngas generator (80) may comprise one or more reactions such as steam reforming, auto-thermal reforming, dry reforming, advanced gas heated reforming, non-catalytic partial oxidation, catalytic partial oxidation, gasification, thermal pyrolysis, or other processes suitable for generating syngas from a carbonaceous material. In preferred embodiment, the first syngas generator (80) comprises oxidative syngas generation. In some of these preferred embodiments, the first syngas generator (80) comprises a partial oxidation reaction, preferably a catalytic partial oxidation reaction, and feed stream (100) comprises at least 50 percent by volume of methane, or at least 80 percent by volume of methane. Conditions and catalysts suitable for operating a catalytic partial oxidation reaction in the first syngas generator (80) are disclosed in U.S. Pat. Nos. 6,402,989; 6,461,539; 6,488,907; 6,635,191; 6,409,940; 6,630,078; 6,946,114, each of which is herein incorporated by reference in its entirety. Suitable conditions and catalysts for operating reforming reactions in the first syngas generator (80) are disclosed in V. R. Choudhary et al., in Catalysis Letters (1995) vol. 32, pg. 387-390; S. S. Bharadwaj & L. D. Schmidt in Fuel Process. Tech. (1995), vol. 42, pg. 109-127; and Y. H. Hu & E. Ruckenstein, in Catalysis Reviews—Science and Engineering (2002), vol. 44(3), pg. 423-453, each of which is incorporated herein by reference in its entirety. Suitable conditions for coal gasification for syngas production using Lurgi gasifiers are disclosed in M. E. Dry, in "*The Fischer-Tropsch Synthesis*", in "Catalyst Science and Technology", J. R. Anderson, et al., eds., vol. 1, Springer-Verlag, Berlin, 1981, pg. 169-170. Other conditions and catalysts suitable for operating a coal gasification in the first syngas generator (80) are disclosed in U.S. Pat. No. 4,872,886; U.S. Pat. No. 4,209,304; U.S. Pat. No. 4,248,604; U.S. Pat. No. 4,531,949; US Pre-Grant Publication No. 2006/007672, and European Patent No. 0225146; each of which is incorporated herein in its entirety.

The first syngas generator (80) may comprise oxidative or non-oxidative conversion promoting conditions, while the second syngas generator (15) comprises non-oxidative conversion promoting conditions. The term 'oxidative' indicates that the syngas generator operates with $O_2$. The term 'non-oxidative' indicates that the syngas generator operates without $O_2$. Preferably, no $O_2$ is fed to the second syngas generator (15). Particularly, no $O_2$ is fed to the reforming zone (15a) or (15b) in the second syngas generator (15).

The first syngas generator (80) generates a syngas effluent (105) (which may also be called 'first synthesis gas stream'), and the second syngas generator (15) which includes reforming zone (15a) or (15b) generates a reforming effluent (45) or (45b) (which may also be called 'second synthesis gas stream'), wherein the first and second synthesis gas streams have different $H_2$:CO molar ratios. The conversion conditions in the first syngas generator (80) may be selected in such a manner to provide a $H_2$:CO molar ratio in the first synthesis gas stream (e.g., syngas effluent (105)) lower than the $H_2$:CO molar ratio in the second synthesis gas stream (i.e., reforming effluent (45) or (45b)).

Syngas effluent (105) may be fed 'as is' to the hydrocarbon synthesis reactor (85). Alternatively, as illustrated in FIG. 7-14, syngas effluent (105) may be treated in water separator (110) in order to generate a drier or dewatered syngas feed to supply the hydrocarbon synthesis reactor (85). The treatment of syngas effluent (105) may include scrubbing, stripping, compression, cooling (not illustrated), or may include a separation (as illustrated) to remove water In some embodiments where the first syngas generator (80) comprises an exothermic syngas production such as a partial oxidation reaction and/or employs a high reaction temperature, the temperature of syngas effluent (105) can be from about 700° C. to about 2,000° C. at the exit of the first syngas generator (80). It is to be understood that the temperature of syngas effluent (105) can be decreased to less than 200° C. and possibly less than 100° C. It is to be understood that any equipment and process suitable for cooling the syngas effluent (105) may be used.

Since syngas effluent (105) may comprise water, syngas effluent (105) may be passed through water separator (110) to remove water from this effluent and thus generate syngas process water stream (115) and syngas feed (120), such that syngas feed (120) comprises a lower water content than syngas effluent (105).

Either of syngas effluent (105) and syngas feed (120) may be called 'first synthesis gas stream'. If syngas effluent (105) is passed through water separator (110) to generate syngas feed (120) which is thus a dewatered portion of syngas effluent (105), syngas feed (120) may be also called a 'portion of the first synthesis gas stream'.

Water separator (110) may comprise one or more separation techniques suitable for separating water from a gas stream without limitation, examples of suitable techniques include condensation, cryogenic separation, vacuum extraction, solvent extraction, filtration (for example, using a membrane, a molecular-sieve filter or a silica-based filter), and distillation.

Preferably, the syngas effluent (105) is separated by condensation to form a gaseous stream (e.g., syngas feed (120)) and a liquid (condensate) stream (e.g., syngas process water stream (115)).

Since the syngas effluent (105) may comprise organic compounds (other than the unreacted carbonaceous feedstocks) which are by-products generated in the first syngas generator (80), at least a portion of these organic compounds may dissolve in the water present in the syngas effluent (105).

Thus, syngas process water stream (115) may comprise dissolved organic compounds which have been generated during syngas production in the first syngas generator (80). The dissolved organic compounds in the syngas process water stream (115) may include one or combinations of these non-limiting examples: $C_1$-$C_4$ organic acids (e.g., formic, acetic, propionic, butyric) and corresponding anions (e.g., formate, acetate, propionate, butyrate), aldehydes (e.g., formaldehyde), alcohols (e.g., methanol), aromatic compounds (e.g., benzene, toluene, xylene), and polyaromatic hydrocarbons (e.g., naphthalene, acenaphthylene, fluorene, phenanthrene, anthracene, fluoranthene, pyrene).

Figure 7:
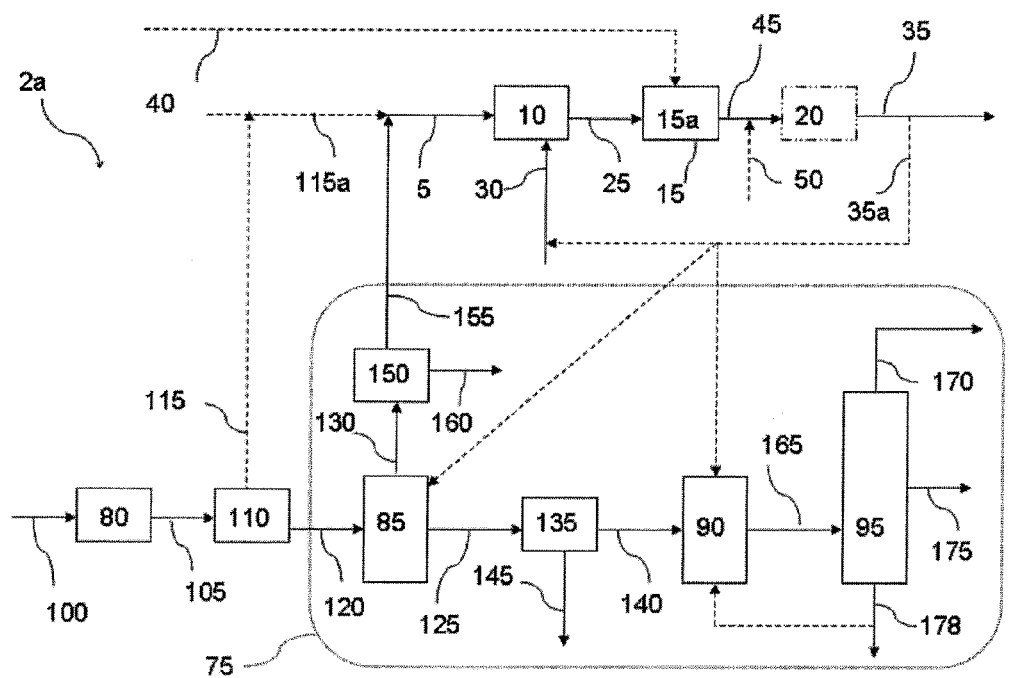
FIG. 7 illustrates a first embodiment of a CTL plant (2*a*) for making synthetic hydrocarbons, oxygenates, water, hydrogen and/or CO, which comprises a first syngas generator, a hydrocarbon synthesis process, and the system (1*a*) of FIG. 1 comprising a second syngas generator comprising a reforming zone.
Figure 8:
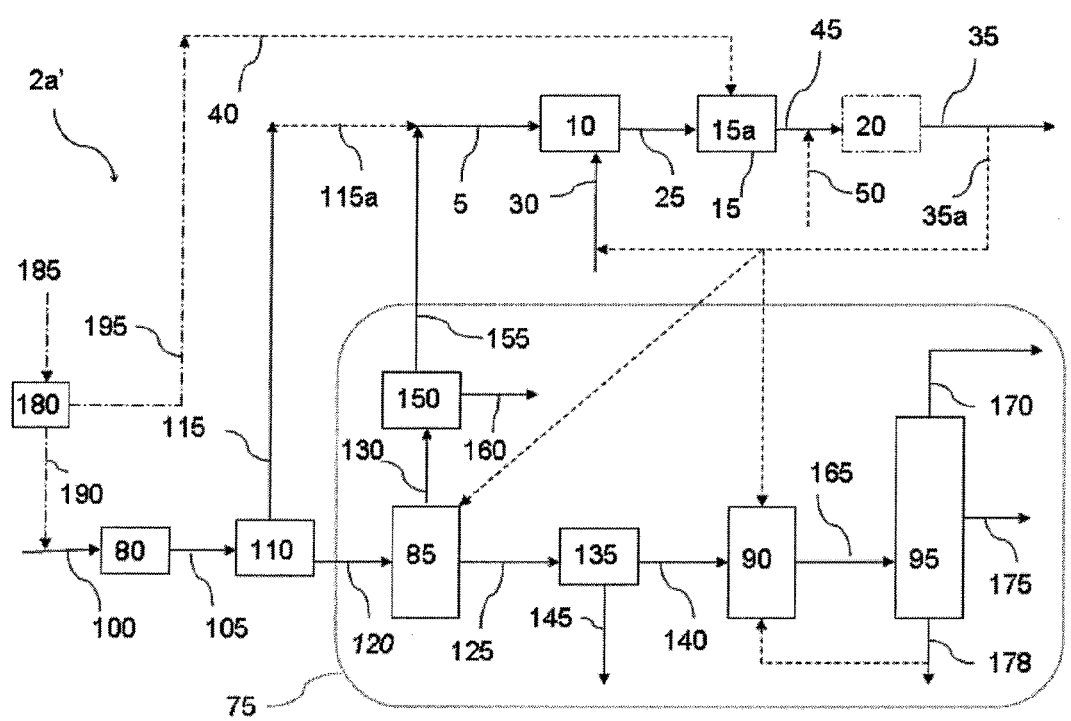
FIG. 8 illustrates an alternate first embodiment of a CTL plant (2*a*') which comprises the CTL plant (2*a*) of FIG. 7 and further comprises a gas plant.
Figure 12:
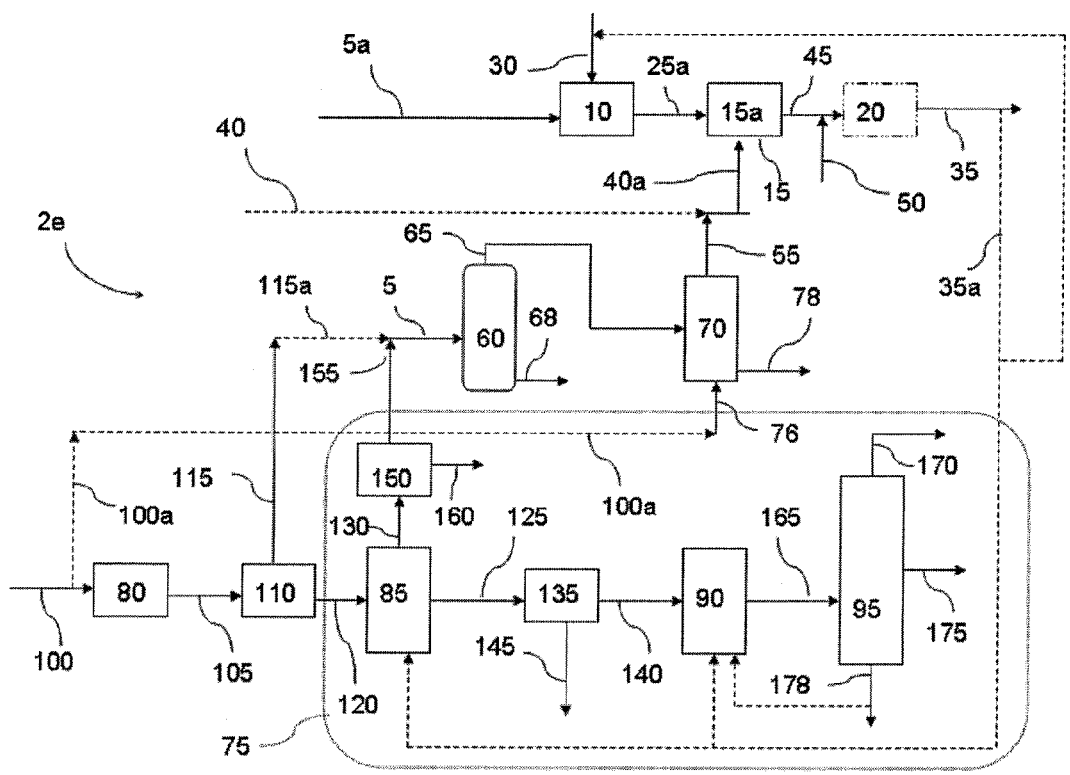
FIG. 12 illustrates a fourth embodiment of a CTL plant (2*e*) which comprises a first syngas generator, a hydrocarbon synthesis process, and the system (1*e*) of FIG. 5 comprising a distillation unit and a stripping unit for generating an oxygenates-rich steam, as well as a second syngas generator containing a reforming zone.
Figure 13:
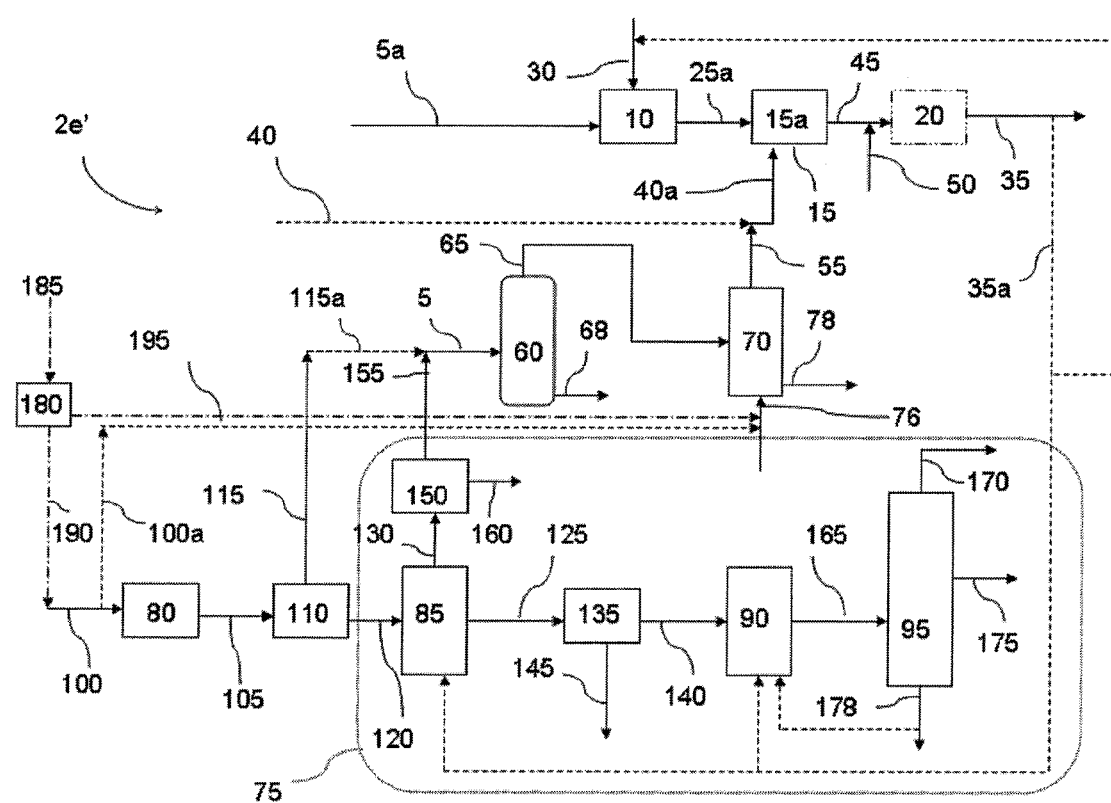
FIG. 13 illustrates an alternate fourth embodiment of a CTL plant (2*e*') which comprises the CTL plant (2*e*) of FIG. 12 and further comprises a gas plant.
Figure 14:
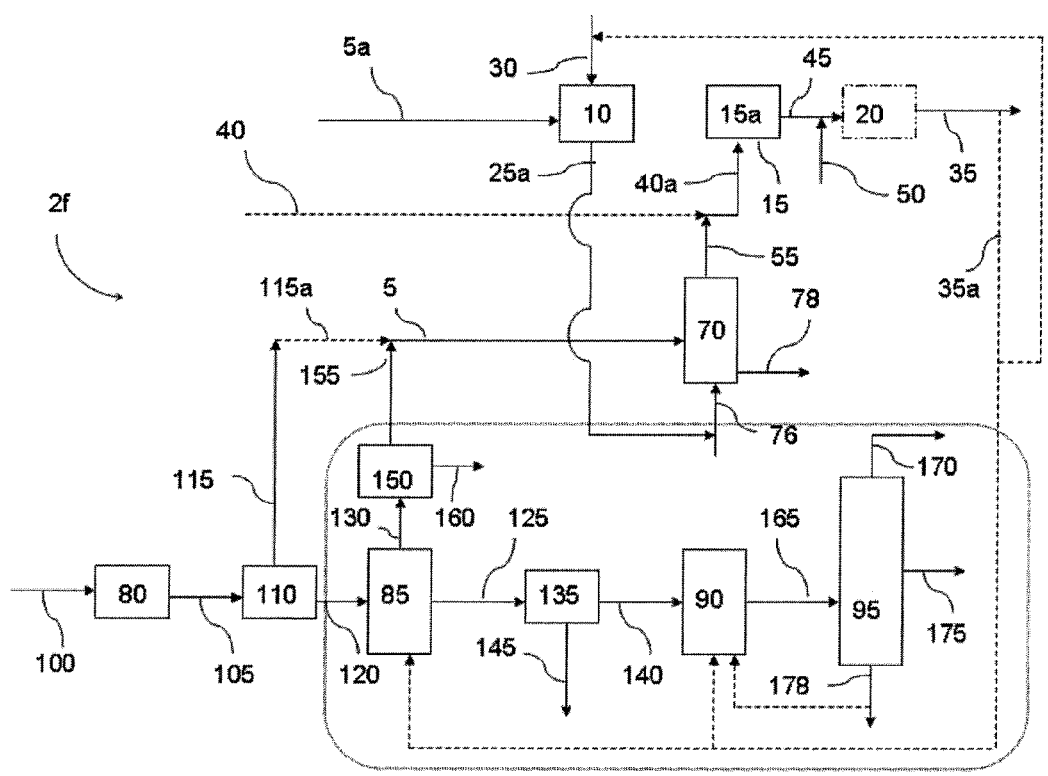
FIG. 14 illustrates a fifth embodiment of a CTL plant (2*f*) which comprises a first syngas generator, a hydrocarbon synthesis process, and the system (1*f*) of FIG. 6 comprising a stripping unit for generating an oxygenates-rich steam and a second syngas generator containing a reforming zone.

Syngas process water stream (115) exiting water separator (110) or a portion thereof (115a) may be employed as one of the water sources for process water feed (5) which may be directed to the steam generator (10) as illustrated in FIG. 7-8, or to the distillation column (60) as illustrated in FIG. 9-13, or to the stripping unit (70) as illustrated in FIG. 14.

In embodiments for example when syngas process water stream (115) has an undesirable acidic content, such as an acidic content greater than 1 wt %., syngas process water stream (115) may not be directed to the steam generator (10), but instead fed to the distillation column (60) (as illustrated in FIG. 9-13).

Syngas feed (120) exiting water separator (110) comprises a mixture of hydrogen and CO, also called 'first syngas stream'. Syngas feed (120) may also contain other gaseous compounds, such as for example $CO_2$ and unconverted light hydrocarbons such as methane, which are non-condensable at the temperature conditions listed above. Syngas feed (120) may be fed in part (not illustrated) or in totality (as illustrated) to the hydrocarbon synthesis reactor (85).

Hydrocarbon synthesis reactor (85) comprises one or more reactor vessels in which hydrocarbons are produced from syngas via Fischer-Tropsch synthesis, alcohol synthesis, and any other suitable synthesis. Hydrocarbon synthesis reactor (85) preferably comprises at least one Fischer-Tropsch reactor.

Any suitable Fischer-Tropsch catalyst for promoting the conversion of $H_2$ and CO to hydrocarbons and/or oxygenates may be employed in hydrocarbon synthesis reactor (85). The Fischer-Tropsch catalyst includes an active catalyst component either unsupported or supported on a material. The support material (also known as the catalyst support) may be a porous material that provides mechanical support for the active catalyst component. Examples of suitable support materials include boehmite-derived transition aluminas, or other refractory oxides such as silica, titania, thoria, zirconia, or mixtures thereof such as silica-alumina. Other examples of suitable support materials are aluminum fluorides and fluorided alumina. The active catalyst component comprises at least one metal from Groups 8, 9, or 10 of the Periodic Table (based on the new IUPAC notation). Preferably, the active catalyst component is iron, cobalt, nickel, ruthenium, or combinations thereof. The amount of active catalyst component present in the catalyst may vary. For instance, the unsupported catalyst may comprise up to about 90% by weight of the active metal per total weight of the catalyst. The supported catalyst may comprise from about 1 to about 50% by weight of the metal component per total weight of the metal component and support material, preferably from about 5 to about 40% by weight, and more preferably from about 10 to about 35% by weight. In addition, the Fischer-Tropsch catalyst may also comprise one or more promoters known to those skilled in the art. Suitable promoters include elements from Groups 1-5, 7, 8, 10, 11 and 13 of the Periodic Table (based on the new IUPAC notation). The catalyst may comprise at least one promoter chosen from the group comprising ruthenium, rhenium, platinum, palladium, silver, lithium, sodium, copper, boron, manganese, magnesium, and potassium. Catalysts suitable for operating hydrocarbon synthesis reactor (85) comprising a Fischer-Tropsch synthesis are disclosed in U.S. Pat. Nos. 6,333,294; 6,365,544; 6,727,289; 6,730,708; 6,759,439; 7,012,104; 7,067,562; 7,071,239; 7,163,963; 7,176,160; 7,186,157; and published U.S. Patent Application No. 2005-0234137, each of which is herein incorporated by reference in its entirety. Typically, at least a portion of the catalytic metal is present in a reduced metallic state. Therefore, the Fischer-Tropsch catalyst is preferably activated by a reduction treatment, prior to its use in hydrocarbon synthesis reactor (85).

The feed to reactor (85) comprises at least the syngas feed (120) which contains synthesis gas generated in first syngas generator (80) from one or more carbonaceous materials, such as biomass, tar sand, shale oil, coal, coke, natural gas, one or more components of natural gas (e.g., any $C_1$-$C_5$ light hydrocarbon such as methane, ethane), or any combinations thereof. Preferably, at least a portion of syngas feed (120) comprises syngas synthesized from methane, a methane-containing stream such as natural gas, petroleum coke, tar sand, shale oil, biomass, or coal in the first syngas generator (80).

Although not illustrated, in addition of syngas feed (120), the feed to reactor (85) may further comprise off-gas recycle from the second syngas generator (15), for example a portion of reforming effluent (45) or (45*b*) or WGS effluent (35) or effluent (35*b*), or off-gas recycle from the hydrocarbon synthesis reactor (85), for example a non-condensable portion of water-reduced hydrocarbon synthesis effluent (160), or another gas stream comprising at least 50% by volume of syngas.

It is preferred that the molar ratio of hydrogen to carbon monoxide in syngas feed (120) be greater than 0.5:1 but less than 5:1 (e.g., from about 0.67 to about 2.5). Preferably, when cobalt, iron, nickel, and/or ruthenium catalysts are used in hydrocarbon synthesis reactor (85), syngas feed (120) contains hydrogen and carbon monoxide in a molar ratio from about 1.4:1 to about 2.3:1. Syngas feed (120) may also contain carbon dioxide. Syngas feed (120) may contain only a low concentration of compounds or elements such as poisons that have a deleterious effect on the hydrocarbon synthesis catalyst present in hydrocarbon synthesis reactor (85). For example, syngas feed (120) may need to be pretreated to ensure that it contains low concentrations of sulfur-containing or nitrogen-containing compounds such as hydrogen sulfide, hydrogen cyanide, ammonia, and carbonyl sulfides.

Syngas feed (120) is contacted with a hydrocarbon synthesis catalyst in a reaction zone of hydrocarbon synthesis reactor (85). The hydrocarbon synthesis catalyst may be also referred to as 'Fischer-Tropsch catalyst'. Mechanical arrangements of conventional design may be employed as the reaction zone in hydrocarbon synthesis reactor (85) including, for example, fixed bed, fluidized bed, slurry bubble column, slurry phase, slurry bed, or ebullating bed reactors, among others. Accordingly, the preferred size and physical form of the catalyst particles used in hydrocarbon synthesis reactor (85) may vary depending on the type of reaction zone in which they are to be used.

Preferably, the hydrocarbon synthesis reactor (85) comprises a slurry bubble column reactor loaded with solid Fischer-Tropsch catalyst particles comprising iron, cobalt or ruthenium with optional activity promoters. The solid Fischer-Tropsch catalyst particles in such a slurry bubble column reactor may have a size varying from submicron up to about 250 microns, but preferably 90 percent by weight of the particles should have a size between about 10 and 150 microns. The solid Fischer-Tropsch catalyst particles should have a weight average size between about 30 microns and 150 microns, or between about 40 microns and 100 microns, or between about 60 microns and 90 microns.

In a slurry-bubble reactor, the Fischer-Tropsch catalyst particles are suspended in a liquid, e.g., molten hydrocarbon wax, by the motion of bubbles of syngas sparged into the bottom of the reactor. As the gas bubbles rise through the reactor, the syngas is absorbed into the liquid where it diffuses to the catalyst for conversion to hydrocarbons. Gaseous products enter the gas bubbles and are collected at the overhead of the reactor in gas effluent (130). Liquid products (recovered in liquid effluent (125)) are recovered from the suspended liquid using different techniques such as filtration, settling, hydrocyclones, and magnetic techniques. Cooling coils immersed in the slurry remove heat generated by the hydrocarbon synthesis reaction.

In preferred embodiments, the hydrocarbon synthesis reactor (85) comprises one or more slurry bubble column reactors operated in series, in parallel or both, each of which comprises particles of a cobalt-containing Fischer-Tropsch catalyst.

Alternatively, the hydrocarbon synthesis reactor (85) may be a fixed bed reactor in which a Fischer-Tropsch catalyst is held in a fixed arrangement that is maintained within a reactor vessel. The syngas feed (120) flowing through the fixed bed reactor contacts the Fischer-Tropsch catalyst contained herein. The reaction heat is typically removed by passing a cooling medium within cooling tubes disposed within the reactor vessel. The reactor vessel may contain a plurality of fixed catalytic arrangements.

In a preferred embodiment, the hydrocarbon synthesis reactor (85) is typically run in a continuous mode. In this mode, the gas hourly space velocity through the reaction zone may range from about 50 $hr^{-1}$ to about 10,000 $hr^{-1}$, preferably from about 300 $hr^{-1}$ to about 2,000 $hr^{-1}$. The gas hourly space velocity is defined as the volume of reactants (hydrogen and CO in syngas feed 120) per time per reaction zone volume. The volume of reactant gases is at standard conditions of pressure (101 kPa) and temperature (0° C.). The reaction zone volume is defined by the portion of the reaction vessel volume where the reaction takes place and which is occupied by a gaseous phase comprising reactants, products and/or inerts; a liquid phase comprising liquid/wax products and/or other liquids; and a solid phase comprising catalyst. In a preferred embodiment, the reaction zone in hydrocarbon synthesis reactor (85) comprises a slurry, wherein the slurry comprises catalyst particles suspended in a liquid comprising Fischer-Tropsch products. The catalyst particles are generally suspended by a gas comprising reactant gases ($H_2$ and CO). Thus, syngas feed (120) serves as supplying the reactant gases ($H_2$ and CO) to the hydrocarbon synthesis reactor (85), but may also serve as a fluidization agent to maintain the catalyst particles in suspension in the slurry or ebullating bed. The reaction zone temperature is typically in the range from about 160° C. to about 300° C. Preferably, the reaction zone is operated at conversion promoting conditions at temperatures from about 190° C. to about 260° C., preferably from about 205° C. to about 230° C. The reaction zone pressure is in the range from about 80 psia (552 kPa) to about 1,000 psia (6,895 kPa). Preferably, the reaction zone pressure is from about 250 psia (1,720 kPa) to about 650 psia (4,480 kPa).

At least two effluents: liquid effluent (125) and gas effluent (130) exit the hydrocarbon synthesis reactor (85). Liquid effluent (125) comprises at least $C_{20+}$ hydrocarbons, but may also comprise lower boiling point hydrocarbons such as $C_5$-$C_{19}$ hydrocarbons. The hydrocarbons in liquid effluent (125) may be saturated (e.g., alkanes) or unsaturated (e.g., alkenes). Liquid effluent (125) may also comprise oxygenated organic compounds, such as alcohols, aldehydes, organic acids, aldols, esters, ethers, or mixture thereof, these oxygenated organic compounds being dissolved and/or trapped in the hydrocarbon matrix of liquid effluent (125). Liquid effluent (125) may also comprise trapped water, since water is produced during hydrocarbon synthesis in reactor (85). Thus, at least a portion of water may be separated from liquid effluent (125) in a hydrocarbon synthesis separation unit (135) to form a water-reduced hydrocarbon synthesis product (140) and a water stream (145). Water stream (145) may be supplied directly 'as is' to steam generator (10), or may be treated or pretreated prior to being fed to steam generator (10).

Hydrocarbon synthesis separation unit (135) may include suitable techniques for separating two or more liquids such as liquid-liquid separators, filtration, stripping, settling, centrifugations, and hydrocyclones. A selective water filtration system is preferred for use in hydrocarbon synthesis separation unit (135). Suitable examples of systems and processes for removal of product water from a Fischer-Tropsch slurry phase reactor are disclosed in U.S. Pat. Nos. 6,403,660; 6,720,358; 7,001,927; and 6,956,063, each of which is herein incorporated by reference in its entirety.

Water-reduced hydrocarbon synthesis product (140) is fed to product upgrading unit (90). Although not illustrated, water-reduced hydrocarbon synthesis product (140) may be combined with a condensable portion of the water-reduced hydrocarbon synthesis effluent (160)—which is collected from water recovery unit (150)—before being fed to product upgrading unit (90).

Thus, the hydrocarbon product stream generated from reactor (85) may comprise water-reduced hydrocarbon synthesis product (140), and may further comprise a condensable portion of the water-reduced hydrocarbon synthesis effluent (160).

In product upgrading unit (90), water-reduced hydrocarbon synthesis product (140) may be hydroprocessed or thermally cracked. As used herein, to "hydroprocess" means to treat a hydrocarbon-containing stream with hydrogen. It is envisioned (although not illustrated) that a condensable hydrocarbon stream generated from water-reduced hydrocarbon synthesis effluent (160) which exits water-recovery unit (150) may be also fed to product upgrading unit (90).

Hydroprocessing in product upgrading unit (90) may comprise a hydrotreatment step, which converts substantially all hydrocarbons present in water-reduced hydrocarbon synthesis product (140) to paraffins. As used herein, to "hydrotreat" means to treat a hydrocarbon stream with hydrogen without making any substantial change to the carbon backbone of the molecules in the hydrocarbon stream.

In some embodiments, hydroprocessing in product upgrading unit (90) may comprise a hydrotreating step A mild hydrotreatment in product upgrading unit (90) may be performed over a hydrotreating catalyst comprising a an active component selected from the group from Ni, Co, Pd, Pt, Mo, W, Cu—Cr combinations, Cu—Zn combinations, and Ru, preferably comprising Ni, Co, Mo, W or combinations thereof, more preferably comprising Ni, over temperatures above 300° F. (about 150° C.), preferably from about 350° F. to about 600° F. (about 170-315° C.), with a hydrogen partial pressure in the outlet of hydroprocessing unit (90) between about 100 psia and about 2,000 psia (about 690-13,800 kPa).

In additional or alternate embodiments, product upgrading unit (90) may comprise a hydrocracking zone. The feedstream to the hydrocracking zone may comprise only a portion of or a fraction of water-reduced hydrocarbon product (140), typically a higher boiling range fraction of water-reduced hydrocarbon product (140). As used herein, to "hydrocrack" means to split an organic molecule and add hydrogen to the resulting molecular fragments to form two smaller hydrocarbons (e.g., $C_{10}H_{22}+H_2 \rightarrow C_4H_{10}$ and skeletal isomers+$C_6H_{14}$ and skeletal isomers). The hydrocracking promoting conditions in product upgrading unit (90) comprise a temperature from about 500° F. to about 750° F. (260-400° C.) and at a pressure from about 500 psig to about 1,500 psig (3,550-10,440 kPa); an overall hydrogen consumption of from about 200 to about 10,000 standard cubic feet per barrel of hydrocarbon feed (scf $H_2$/bbl HC) [about 35-1,800 STP $m^3$ $H_2$/$m^3$ HC feed]; using a liquid hourly space velocity based on the hydrocarbon feedstock from about 0.1 $hr^{-1}$ to about 10 $hr^{-1}$. Hydrocracking in product upgrading unit (90) takes place over a hydrocracking catalyst comprising a hydrogenation component and a cracking component (typically an acid component). The hydrogenation component may include a metal selected from among platinum (Pt), palladium (Pd), nickel (Ni), cobalt (Co), tungsten (W), molybdenum (Mo), and combinations thereof. The hydrogenation component may include Pt, Pd, or combination thereof. The cracking component may be an amorphous cracking material and/or a molecular sieve material, and it generally supports the hydrogenation component. A preferred cracking component comprises an amorphous silica-alumina, a zeolite, or combinations thereof.

In some other embodiments, product upgrading unit (90) may comprise thermal cracking conditions. As used herein, "thermal cracking" generally refers to the breaking down of high molecular weight material into lower molecular weight material by applying heat without the use of a catalyst. There is typically little skeletal isomerization during thermal cracking. Thermal cracking of hydrocarbons is well known in the art. Thermal cracking may be carried out on waxy fraction (180), which is shown as being recycled in part to product upgrading unit (90) in dotted line on FIG. 7-14, and/or on water-reduced hydrocarbon synthesis product (140) to primarily linear hydrocarbons by any suitable thermal cracking process. Thermal cracking basically aims at the reduction of molecular size by application of heat without addition of catalyst or hydrogen. The cracking conditions to be applied and the amount and type of cracked products can depend largely on the type of feedstock.

Upgraded product stream (165) leaves product upgrading unit (90) and is fed to fractionator (95) where it is separated into distillation cuts. The distillation cuts may include a light cut (170), at least one middle cut (175) (e.g., diesel and naphtha), and a waxy cut (178). Upgraded product stream (165) can be fractionated in fractionator (95) by any suitable fractionation method.

Even though product upgrading unit (90) is shown upstream of the product fractionator (95), it is envisioned that an upgrading step can be performed on one or more individual fractions from the product fractionator (95) such as a naphtha cut, or a diesel cut and/or the heavy cut, such as waxy cut (178), either instead of or in addition to the upgrading of water-reduced hydrocarbon synthesis product (140).

Various embodiments and various arrangements of product fractionator (95) and upgrading unit (90) (such as hydrocracker, hydrotreater, hydroisomerization unit and thermal cracker) and their respective operating conditions in a product work-up section of a CTL plant, which are suitable for use in hydrocarbon synthesis process (75) are disclosed in co-owned U.S. published Patent Applications Nos. 2004-

0173501; 2004-0236164; 2005-0035026; 2005-0205462; 2006-0006098, each of which is incorporated herein by reference in its entirety.

Referring back to the operation of reactor (85) in hydrocarbon synthesis process (75), the gas effluent (130) exiting the hydrocarbon synthesis reactor (85) comprises a majority of the water produced in the hydrocarbon synthesis reactor (85) but may also comprise unconverted hydrogen and carbon monoxide, carbon dioxide, light hydrocarbons (typically saturated and/or unsaturated $C_1$-$C_5$ hydrocarbons), and oxygenates (acids, alcohols, ethers, and the like). At least a portion of gas effluent (130) is passed through water recovery unit (150) to generate hydrocarbon synthesis product water stream (155) and water-reduced hydrocarbon synthesis effluent (160).

Water recovery unit (150) can comprise any suitable technique suitable for separating liquids from gases such as vapor separators, condenser, distillation, flash separators, cryogenic separation, and combinations thereof. Water recovery unit (150) preferably comprises one or more condensers. In one embodiment, water recovery unit (150) comprises two condensers operated at different temperatures (the downstream condenser at a lower temperature than the upstream condenser) to maximize water recovery from gas effluent (130).

Although not illustrated, water recovery unit (150) may also provide a condensable hydrocarbon fraction, for example a condensable fraction of stream (160), which can then be sent directly to product fractionator (95) or can be fed to product upgrading unit (90) (not illustrated). This condensable hydrocarbon fraction may be fed directly to product upgrading unit (90) or may be first combined with water-reduced hydrocarbon synthesis product (140) before entering product upgrading unit (90).

Although not illustrated, any portion of gas effluent (130) that is not sent to water recovery unit (150) may be recycled to hydrocarbon synthesis reactor (85) and/or directed to first syngas generator (80). Although not illustrated, a non-condensable portion of water-reduced hydrocarbon synthesis effluent (160) may be recycled in part or in totally to hydrocarbon synthesis reactor (85) and/or directed to first syngas generator (80).

Integration of a Process for Making at Least Hydrogen into a CTL Process

The CTL process embodied in FIG. 7-14 shows how various water sources may be created within the CTL plant from the hydrocarbon synthesis process (75) and from a syngas treatment for example in separator (110) and then how these various water sources may be utilized in providing all or part of process water feed (5) to the various systems for producing hydrogen embodied by FIG. 1-6.

The process water feed (5) in the CTL plants of FIG. 7-14 may comprise water from at least one source from hydrocarbon synthesis process (75). The sources of water in hydrocarbon synthesis process (75) can be provided, as illustrated, by hydrocarbon synthesis reactor (85) and/or first syngas reactor (80) or, not illustrated by product upgrading unit (90), product fractionator (95), water strippers, cooling units that use water as coolant, a catalyst regenerator, a catalyst activator, and any water source from other units in the hydrocarbon synthesis process (75) in which water may be present, utilized, or produced. Water produced in the hydrocarbon synthesis reactor (85) is a preferred water source for process water feed (5).

Hydrocarbon synthesis product water stream (155) as well as water stream (145) include oxygenates from the hydrocarbon synthesis reactor (85) that typically include one or combinations of these non-limiting compounds: $C_1$-$C_4$ acids (e.g., acetic acid, propionic acid) and corresponding anions with either organic or inorganic cations (e.g., ethyl acetate, propionate, butyrate), aldehydes (e.g., propanal, butanal, pentanal), alcohols (e.g., methanol, ethanol, propanol, 2-propanol, butanol, 2-butanol, pentanol, hexanol), esters, aldols, ethers, carboxylic anions, and ketones (e.g., acetone, 2-butanone, 2-pentanone). In some embodiments, hydrocarbon synthesis product water stream (155) comprises alcohols, aldehydes, ketones, esters, aldols, ethers, carboxylic acids, carboxylic anions, or combinations thereof. Oxygenates in water streams (155) and (145) are dissolved in the bulk of water.

Process water streams generated by hydrocarbon synthesis reactor (85) include hydrocarbon synthesis product water stream (155) recovered from gas effluent (130) and water stream (145) recovered from liquid effluent (125), both of which contain dissolved oxygenates. Either or both of these water streams (145) and (155) may serve as one oxygenates feedstock to the catalytic reforming zone (15a) or (15b).

Oxygenates originating from hydrocarbon synthesis reactor (85) and optionally from the first syngas generator (80) may be fed to the catalytic reforming zone (15a) or (15b) via the produced steam (25) and/or via the mixed stream (40a), or oxygenates-rich stream (55). For example, the oxygenates fed to reforming zone (15a) or (15b) may be provided by at least hydrocarbon synthesis product water stream (155), but may also be provided by water streams (115a) and (145).

Referring to FIGS. 7-10 & 12-14, the portion (35a) of WGS effluent (35) may provide, in part, some fuel for heat supply (30) to steam generator (10), but may be further directed to one or more units within the hydrocarbon synthesis process (75). As non-limiting examples illustrated in FIGS. 7-10 & 12-14 in dotted lines, portion (35a) of the WGS effluent (35) may be used as fuel for heat supply (30), or directed to hydrocarbon synthesis reactor (85) and/or to product upgrading unit (90).

The process embodied by FIG. 7-14 further shows how synthetic hydrocarbons, water and oxygenates are formed by hydrocarbon synthesis process (75), and how some of formed oxygenates are supplied to the second syngas generator (15) where they are converted to provide additional hydrogen for one or more units within the CTL plant. Some embodiments include forming the process water feed (5) by combining hydrocarbon synthesis product water stream (155), with any or the following water sources for example: (as illustrated) syngas process water stream (115) or a portion (115a) thereof, or (not illustrated) water stream (145), any water stream(s) recovered from product upgrading unit (90), a water stripper, a cooling unit, a catalyst regenerator, a catalyst activator, product fractionator (95), or any combinations thereof. Therefore, process water feed (5) which supplies steam generator (10) generally comprises at least a portion of hydrocarbon synthesis product water stream (155), but may further comprise at least a portion (115a) of syngas process water stream (115), or at least a portion of water stream (145) (not illustrated), or combinations thereof. The combination of hydrocarbon synthesis product water stream (155) and at least a portion (115a) of syngas process water stream (115) is illustrated in FIG. 7-14.

The following describes exemplary applications of the present CTL plants illustrated in FIG. 7-14.

In FIG. 7-8, the second syngas generator (15) comprises steam reforming zone (15a), and hydrocarbon synthesis product water stream (155) may be first fed to steam generator (10) to produce steam (25) which is then directed to steam reforming zone (15a). A portion (115a) of or all of syngas process water stream (115) exiting water separates (110) may also be fed to steam generator (10). Water stream (145) collected from the separation of hydrocarbon synthesis reactor liquid effluent (125) through hydrocarbon synthesis separation unit (135) may also be fed, in part or in totally, indirectly or directly into steam generator (10).

FIG. 8 illustrates CTL plant (2a') which comprises the system (2a) of FIG. 7, and further comprises a gas plant (180). The gas plant (180) in system (2a') comprises a gas separation system which can separate a hydrocarbonaceous gas stream into a light hydrocarbonaceous stream and a heavy hydrocarbonaceous stream. For example, the gas plant (180) may be effective in separating a natural gas stream (185) into a methane-rich stream (190) and a $C_2$-rich stream (195). The methane-rich stream (190) may provide a portion of or the totality of the feed stream (100) entering the first syngas generator (80). The $C_2$-rich stream (195) may provide a portion of or the totality of the organic feed (40) entering the catalytic reforming zone (15a) in the second syngas generator (15). The gas separation system in the gas plant (180) may comprise a cryogenic distillation, such as a demethanizer, a deethanizer, or combinations thereof. The methane-rich stream (190) may be provided by a methane-rich overhead stream exiting a cryogenic distillation (e.g., demethanizer) which is supplied by a pretreated natural gas stream, while the $C_2$-rich stream (195) may be provided by the bottoms stream exiting the cryogenic distillation. The pretreatment of natural gas stream (before cryogenic distillation) generally includes water removal, metals removal and acid gases removal (e.g., $CO_2$, $H_2S$).

Referring to FIG. 9-14, according to the second aspect of the present invention, the process water (5) is treated or purified, and oxygenates contained herein are enriched, concentrated and/or selectively removed before the oxygenates are ultimately supplied to the second syngas generator (15) comprising reforming zone (15a) or (15b). Some of the units and processes for process water treatment and oxygenates enrichment are illustrated in FIG. 9-14, and their respective operation methods integrated into various CTL plants (2b, 2b', 2c, 2d, 2e, 2e', 2f) are described as follows.

FIG. 9 illustrates an embodiment of a CTL plant (2b) which integrates system (1b) of FIG. 2 which was previously described. The process embodied by system (2b) in FIG. 9 integrates the process for making hydrogen and optionally CO embodied by system (1b) of FIG. 2 which includes a treatment (by distillation) of process water feed (5). Process water feed (5) may be provided by hydrocarbon synthesis product water stream (155) and optionally by water stream (145) and/or portion (115a) of syngas process water stream (115). The oxygenates in process water feed (5) are enriched and converted via reforming to at least hydrogen in the system (1b) as previously described.

FIG. 10 illustrates a CTL plant (2b') which comprises substantially all of the elements of system (2b) of FIG. 9, and further comprises gas plant (180). The separation of gas stream (185) in the gas plant (180) to provide streams (190) and (195) has been previously described in reference to FIG. 8. Stream (195) exiting gas plant (180) may provide at least in part the optional organic feed (40) to the reforming zone (15a).

FIG. 11 illustrates an embodiment of a CTL plant (2c) which integrates previously described system (1c) of FIG. 3, which comprises optional adjustment unit (72), liquid-phase reforming zone (15b) in second gas generator (15), and optional purification system (74). The process for making hydrocarbons, water and oxygenates embodied by CTL plant (2c) in FIG. 11 integrates the process for making hydrogen and $CO_2$ embodied by system (1c) of FIG. 3 which includes a treatment (by distillation) of process water feed (5) and further employs liquid-phase reforming zone (15b) and an optional enrichment unit to form a $H_2$-rich effluent (35b). Product water stream (155) is a preferred water source for process water feed (5); however, portion (115a) of water stream (115) exiting syngas water separator (110) may also serve as a water source to process water feed (5). Water stream (145) may also serve as a water source for process water feed (5) (not illustrated).

FIG. 12 illustrates an embodiment of a CTL plant (2e) for making synthetic hydrocarbons, synthesis gas and/or hydrogen which integrates previously described system (1e) of FIG. 5, which comprises distillation unit (60), stripping unit (70), steam generator (10), reforming zone (15a) in second syngas generator (15), and WGS zone (20). The process for making hydrocarbons, water and oxygenates embodied by CTL plant (2e) in FIG. 12 integrates the process for making hydrogen or syngas embodied by system (1e) of FIG. 5 which includes a treatment (by distillation and stripping) of process water feed (5) and employs vapor-phase reforming in zone (15a) to form a $H_2$-rich effluent (35). It is to be noted (illustrated in dotted line) that in the operation of system (2e), the stripping fluid (76) may be provided, in part or in totality, by a slipstream (100a) of the feed stream (100).

FIG. 13 illustrates a CTL plant (2e') for making hydrocarbons, water and oxygenates, which comprises substantially all of the elements of elements of CTL plant (2e) of FIG. 12, and further comprises gas plant (180). The separation of gas stream (185) in the gas plant (180) to provide streams (190) and (195) has been previously described in reference to FIG. 8. It is to be noted that in the operation of CTL plant (2e'), the feed stream (100) which supplies the first syngas generator (80) may be provided, in part or in totality, by methane-rich stream (190) exiting gas plant (180). Similarly, the stripping fluid (76) which supplies the stripping unit (70) may be provided, in part or in totality, by $C_2$-rich stream (195) exiting gas plant (180) and/or by a slipstream (100a) of the feed stream (100). Although not illustrated, the optional organic feed (40) which supplies the reforming zone (15a) in second syngas generator (15) may be provided, at least in part, by $C_2$-rich stream (195) exiting gas plant (180).

FIG. 14 illustrates an embodiment of a CTL plant (2f) for making synthetic hydrocarbons, synthesis gas and/or hydrogen. The CTL plant (2f) integrates system (1f) of FIG. 6 previously described, which comprises stripping unit (70), steam generator (10), reforming zone (15a) in second syngas generator (15), and WGS zone (20). The process for making hydrocarbons, water and oxygenates embodied by CTL plant (2f) in FIG. 14 integrates the process for producing hydrogen embodied by system (1f) of FIG. 6 which includes a treatment (by stripping) of process water feed (5) and employs vapor-phase reforming in zone (15a) and optionally a WGS zone (20), to ultimately form the $H_2$-rich effluent (35).

Referring back to FIGS. 7-10 & 12-14, WGS effluent (35) (alternatively, reforming effluent (45) when WGS zone (20) is not used), may be further passed through a purification system (not illustrated in these drawings). In the purification system, hydrogen may be selectively extracted from other components of effluent (35) or (45), and/or where $CO_2$ may be removed from effluent (35) or (45). The purification system may include amine scrubbing for the removal of $CO_2$. The purification system may include a pressure-swing adsorption unit or a membrane separation unit for the selective separation of hydrogen from other components of effluent (35) or (45). As previously mentioned in reference to unit (74) in FIG. 3, examples of hydrogen selective purification may be found in an article by Adhikari et al "*Hydrogen Membrane Separation Techniques*", Industrial & Engineering Chemistry Research, vol. 45 (2006) pg. 875-881, as well as in U.S. Pat. Nos. 5,782,960; 6,527,833; 7,125,440, each of which is incorporated herein by reference in its entirety.

The resulting purified stream exiting the purification system thus may be enriched in hydrogen. The resulting purified stream may also be leaner in $CO_2$. Purified stream may comprise greater than about 80 vol. % by volume $H_2$, or greater than about 85 vol. % $H_2$, or greater than about 90 vol. % $H_2$. Purified stream can be used to meet various needs in a CTL plant to supply some of its units with hydrogen.

Another stream (not illustrated) exiting the purification system may primarily contain components other than $H_2$ and may be used as fuel in various units of the CTL plants in FIGS. 7-10 & 12-14, such as pre-heaters and/or gas turbines. Examples of suitable pre-heaters may include a hydrocarbon synthesis reactor pre-heater, a product fractionator pre-heater, and a hydrocarbon synthesis product upgrading pre-heater. An example of a gas turbine is one that is employed to generate electricity for a CTL plant.

Referring to FIG. 1-14, a hydrogen-rich stream exiting a water-gas shift zone (such as WGS effluent (45) exiting WGS zone (20) in FIGS. 1, 2, 4-10 & 12-14) or a hydrogen-rich stream exiting a purification unit (such as stream (35b) exiting purification unit (74)) in FIGS. 3 & 11) may be used as a fuel source for supplying heat to steam generator (10). For example as illustrated in FIGS. 1, 2, 4-10 & 12-14, the portion (35a) of WGS effluent (35) can provide fuel for heat supply (30). Alternatively or additionally, a hydrogen-rich stream exiting a water-gas shift zone or exiting a purification unit may be directed to one or more units within the hydrocarbon synthesis process (75). As illustrated in FIG. 7-14 in dotted lines, portion (35a) of WGS effluent (35) or purified stream (35b) may be directed to hydrocarbon synthesis reactor (85) and/or to product upgrading unit (90).

Examples of uses of $H_2$-rich stream in hydrocarbon synthesis reactor (85) may include adding the $H_2$-rich stream to syngas feed (120) to adjust the $H_2$ and/or CO contents or $H_2$:CO molar ratio herein. The $H_2$/CO molar ratio in syngas feed (120) may be adjusted to a value in the range of from about 0.67:1, to about 5:1, or from about 1.5:1 to about 3.0:1, or from about 1.7:1 to about 2.4:1, this value being dependant on the type of catalyst and process conditions utilized in the hydrocarbon synthesis reactor (85).

Hydrogen-rich stream in the systems illustrated in FIG. 1-6 may be provided by the reforming effluent (45) or (45b)—also be referred to as 'second synthesis gas stream' (which is produced by reforming of at least oxygenates in syngas generator (15)), or by a purified stream from the reforming effluent (45) or (45b) (such as stream (35b) illustrated in FIG. 3), or by the shifted WGS effluent (35), or by any combinations thereof. Any of these hydrogen-rich streams may be passed to multiple users of hydrogen in any of the CTL plants illustrated in FIG. 7-14. It is to be understood that any hydrogen-rich stream (45; 45b; 35; 35b) can be introduced to different combinations of hydrogen users in various embodiments of the present invention. For example, embodiments may include passing the second synthesis gas stream (e.g., effluent (45)), or a purified portion thereof (e.g., streams (35) or (35b)) in at least one of the units selected from the group consisting of a water-gas shift reactor; a hydrogen separation unit; a $CO_2$ removal unit; a hydrocarbon synthesis reactor; a catalyst activation unit; a catalyst regeneration unit, a product upgrading unit, a water stripper, and combinations thereof. Passing the second synthesis gas stream (or a purified portion thereof) to at least one of the hydrogen users (listed above) may be carried out in order to enhance at least one factor selected from the group consisting of increased market value of the produced synthetic hydrocarbons (e.g., cuts 170, 175, 178); increased productivity of the hydrocarbon synthesis process (75); activity of the hydrocarbon synthesis catalyst inside reactor (85); longevity of the hydrocarbon synthesis catalyst; and any combination thereof.

Various embodiments and various arrangements of hydrogen management in a GTL plant which are suitable for use of the formed hydrogen-rich stream, e.g., any of streams (35, 35b, 45, or 45b) in the CTL plants of FIG. 7-14 are disclosed in co-owned U.S. Pat. No. 6,872,753 by Landis et al; U.S. Pat. No. 6,946,493 by Mohedas et al; and U.S. Pat. No. 6,958,363 by Espinoza et al; each of which is incorporated herein by reference in its entirety.

Referring back to FIG. 7-14, it is to be understood that the syngas generator (15) may be an exiting steam reformer unit from a refining facility which may be in proximity to the hydrocarbon synthesis process (75). In such embodiment, the first syngas unit (80), the water separator (110), and hydrocarbon synthesis process (75) in the CTL plant of any FIG. 7-14 may be constructed adjacent to or close enough to an existing refinery which already employs a steam reformer, so as to allow fluid communication between the syngas generator (15) and any unit of process (75) such as reactor (85), product upgrading (90) and product fractionator (95) by pipes or conduits.

Similarly, it is to be understood that steam generator (10) may be an existing steam generator unit from a refining facility which may be in proximity to the hydrocarbon synthesis process (75). In such embodiment, the hydrocarbon synthesis process (75) in the CTL plant of any FIG. 7-14 may be constructed adjacent to or close enough to an existing refinery which already employs the steam generator, so as to allow the water sources (e.g., streams 155, 145, 115a) exiting the water separator (110) or exiting any of the units in process (75), such as reactor (85) or hydrocarbon synthesis separation unit (135), to be directed to the steam generator by pipes or conduits.

Referring to treatment of process water feed (5) in systems of FIG. 1-6 and CTL plants in FIG. 7-14, a water pretreatment may be carried our before the treatment step which provides an oxygenates-rich stream, such as distillation and/or stripping. Examples of water pretreatment methods may include at least one of the following steps selected from the group consisting of: adjusting the pH of process water feed (5) to a desirable value; adjusting the temperature of process water feed (5); removing solids from process water feed (5); removing metals from process water feed (5); removing insoluble or suspended organics from process water feed (5); removing acidic oxygenates (e.g., by ion-exchange) from process water feed (5); concentrating oxygenates in process water feed (5); diluting process water feed (5) with freshwater or purified water; and any combinations of two or more of these steps.

In not-illustrated exemplary embodiments, the process water feed (5) may be pretreated by adjusting its pH before its entry into any of the systems (1a; 1b; 1c; 1d; and 1e) illustrated in FIG. 1-6 and those integrated into CTL plants (2a; 2a'; 2b; 2b'; 2c; 2e; 2e'; 2f). Adjusting the pH of process water feed (5) may include changing the pH to a desirable value (e.g., between 6 and 9). Adjusting the pH may include neutralization of acidic components of the process water feed (5) to increase the pH in the pretreated process water to a desirable value greater than 6, or between about 6 and about 9, or between about 5.5 and about 8.5, or between about 6.5 and about 7.5. Adjusting the pH may include neutralization of alkaline components of the process water feed (5) to decrease the pH in the pretreated process water to a desirable value lower than 9, or between about 6 and about 9, or between about 5.5 and about 8.5, or between about 6.5 and about 7.5.

The neutralization can be done by the addition of either an alkaline material (having a pH higher than 7) or an acidic material (having a pH lower than 7). The alkaline or acid material can be in the form of a solution. The product water stream (e.g., 155, and/or 145 illustrated in FIG. 7-14) from hydrocarbon synthesis reactor (85) may be acidic, so neutralization of process water feed (5) generally comprises adding an alkaline compound, i.e., any compound (solid or liquid) that may liberate a hydroxide ion, or a combination of alkaline compounds. Suitable alkaline compounds include ammonia, urea, any hydroxide-containing compound such as ammonium hydroxide, a compound comprising an alkali element or alkali earth element from Groups 1-2 of the Periodic Table of Elements (new IUPAC notation) such as lithium, sodium, potassium, rubidium, calcium, strontium, or barium, any carbonate-containing compound, or any combinations thereof. It is to be understood that any of the water sources for process water feed (5) such as water streams (115*a*, 145, 155) may be pretreated individually, collectively, or in combinations thereof, before forming process water feed (5).

In additional or alternate (not-illustrated) exemplary embodiments, pretreatment of process water feed (5) may include passing process water feed (5) through an ion-exchange column to replace some of the acidic ions present in process water feed (5) by more alkaline ions. The ion-exchange step may increase the pH of process water feed (5) to a desirable value, e.g., greater than about 6.

In yet additional or alternate (not-illustrated) exemplary embodiments, when the process water feed (5) comprises a product water generated in a hydrocarbon synthesis process, pretreatment of process water feed (5) may include removing contaminating metals by ion exchange, adsorption bed, and/or distillation to form a pretreated process water feed which is leaner in contaminating metals or substantially free of contaminating metals and is more suitable for making steam. The contaminating metals to be removed may include iron, cobalt, nickel, ruthenium, chromium, and any other metal(s) that may be present in catalysts and/or that may leach out of any equipment in the hydrocarbon synthesis process.

It is to be understood that hydrocarbon synthesis process (75) and its operation are not limited to the process units (85; 90; 95; 135; and 150) illustrated in FIG. 7-14 and steps described earlier. Hydrocarbon synthesis process (75) may include any other units suitable for processing hydrocarbon product stream (125) or (140). For instance, embodiments may include more than one upgrading unit (90), which may be upstream and/or downstream of the product fractionator (95). Additional embodiments may include fractionating hydrocarbon synthesis product (125) and/or water-reduced stream (140) before upgrading in unit (90). Further embodiments may include upgrading waxy cut (178) by sending at least a portion of waxy cut (178) to upgrading unit (90), as illustrated in dotted line in FIG. 7-14. In this embodiment, upgrading unit (90) may comprise a cracking unit, such as a thermal cracker or a hydrocracker, and the resulting cracked hydrocarbon stream may be fed to product fractionator (95).

While the preferred embodiments of the invention have been shown and described, modifications thereof can be made by one skilled in the art without departing from the spirit and teachings of the invention. The embodiments described herein are exemplary only, and are not intended to be limiting. Many variations and modifications of the different aspects of the present invention disclosed herein are possible and are within the scope of the invention. Accordingly, the scope of protection is not limited by the description set out above, but is only limited by the claims which follow, that scope including all equivalents of the subject matter of the claims.

Use of the term "optionally" with respect to any element of a claim is intended to mean that the subject element is required, or alternatively, is not required. Both alternatives are intended to be within the scope of the claim. Each and every claim is incorporated into the specification as an embodiment of the present invention. Thus the claims are a further description and are an addition to the preferred embodiments of the present invention.

Any discussion of a reference in the current specification is not an admission that it is prior art to the present invention, especially any reference that may have a publication date after the priority date of this application. The disclosures of all patents, patent applications and publications cited herein are hereby incorporated herein by reference, to the extent that they provide exemplary, procedural or other details supplementary to those set forth herein. Additionally, to the extent that any disclosure incorporated herein conflicts with the express teachings of the current specification or renders any part of the current disclosure unclear, the present specification shall take precedence.

What is claimed is:

1. A process for producing synthetic hydrocarbons and further producing hydrogen and optionally CO in a carbon-to-liquids system comprising two syngas generators operated in parallel, the process comprising:
   (a) converting a carbonaceous feedstream in a first syngas generator to form a first synthesis gas stream comprising carbon monoxide and hydrogen;
   (b) feeding said first synthesis gas stream or a portion thereof to a hydrocarbon synthesis reactor comprising a hydrocarbon synthesis catalyst, under conversion promoting conditions sufficient to produce synthetic hydrocarbons, product water, and oxygenates, thereby generating a hydrocarbon product stream and a process water stream, said hydrocarbon product stream comprising at least a portion of said synthetic hydrocarbons, said process water stream comprising at least a portion of the produced oxygenates dissolved in at least a portion of product water, and said hydrocarbon synthesis catalyst is selected from a group 9 or 10 element;
   (c) treating said process water stream to form an oxygenates-rich stream, said oxygenates-rich stream comprising a reforming reactant and oxygenates originating from said hydrocarbon synthesis product water, wherein said treating to form said oxygenates-rich stream comprises passing said process water stream through a distillation unit to form an oxygenates overhead stream and stripping said oxygenates overhead stream with a stripping fluid comprising said reforming reactant; and
   (d) passing said oxygenates-rich stream in a reforming zone in a second syngas generator under steam reforming promoting conditions with a steam reforming catalyst sufficient for the conversion of said oxygenates and said reforming reactant to form at least hydrogen and optionally carbon monoxide, wherein the steam reforming catalyst comprises rhodium, iridium, osmium, cerium, lanthanum, or mixtures thereof, and to generate a second synthesis gas stream comprising said formed hydrogen and optionally said formed carbon monoxide.

2. The process according to claim 1, wherein step (c) comprises passing said oxygenates overhead stream through a steam generator to generate a steam product which provides said oxygenates-rich stream, said oxygenates-rich stream comprising steam as the reforming reactant.

3. The process according to claim 1, wherein said reforming zone comprises steam reforming promoting conditions, wherein the treating in step (c) further comprises stripping said oxygenates overhead stream with a stripping fluid comprising steam to provide said oxygenates-rich stream, said oxygenates-rich stream comprising steam as said reforming reactant.

4. The process according to claim 1, wherein said reforming zone comprises steam reforming promoting conditions, wherein the treating in step (c) further comprises stripping said oxygenates overhead stream with a stripping fluid comprising an organic reforming reactant to provide said oxygenates-rich stream, said oxygenates-rich stream comprising said organic reforming reactant, said organic reforming reactant being selected from the group consisting of a $C_1$-$C_5$ hydrocarbon, a mixture of $C_1$-$C_5$ hydrocarbons, an alcohol, a mixture of alcohols, and combinations thereof; and further wherein step (d) further comprises feeding steam to said reforming zone.

5. The process according to claim 1, wherein said oxygenates-rich stream comprises an organic reforming reactant selected from the group consisting of a $C_1$-$C_5$ hydrocarbon, a mixture of $C_1$-$C_5$ hydrocarbons, an alcohol, a mixture of alcohols, and combinations thereof; and further wherein step (d) further comprises feeding $CO_2$ to said reforming zone.

6. The process according to claim 1, wherein the treating in step (c) is effective in removing acidic oxygenates from said process water stream to form said oxygenates-rich stream to be substantially free of acidic oxygenates.

7. The process according to claim 1, wherein said reforming reactant in said oxygenates-rich stream comprises an organic reforming reactant selected from the group consisting of a $C_1$-$C_5$ hydrocarbon, a mixture of $C_1$-$C_5$ hydrocarbons, an alcohol, a mixture of alcohols, and combinations thereof; and further wherein step (d) further comprises feeding an inorganic reforming reactant to said reforming zone, said inorganic reforming reactant being selected from the group consisting of steam, carbon dioxide, and combinations thereof.

8. The process according to claim 1, wherein said reforming reactant in said oxygenates-rich stream is water in liquid phase, water in vapor phase, carbon dioxide, or combinations thereof.

9. The process according to claim 1, wherein said reforming zone comprises steam reforming promoting conditions, and wherein the process further comprises after step (c) and prior to step (d) the following step: passing said oxygenates-rich stream through a steam generator to generate a steam product, whereby said generated steam product comprising steam as said reforming reactant and at least a portion of said oxygenates originating from said hydrocarbon synthesis process water stream; and further wherein said generated steam product is fed to said reforming zone in step (d).

10. The process according to claim 1, further comprising pretreating said process water stream prior to performing step (c), said pretreating comprising at least one of the following steps selected from the group consisting of: adjusting the pH of said process water stream to a desired value; adjusting the temperature of said process water stream; removing solids from said process water stream; removing metals from said process water stream; removing insoluble or suspended organics from said process water stream; removing acidic oxygenates from said process water stream; concentrating oxygenates in said process water stream; diluting said process water stream with freshwater or purified water; and any combinations of two or more of these steps.

11. The process according to claim 1, wherein said oxygenates-rich stream comprises at least one oxygenate selected from the group consisting of alcohols, aldehydes, ketones, esters, aldols, ethers, organic acids, organic anions, and any combinations of two or more thereof.

12. The process according to claim 1, further comprising the following step: (e) supplying at least a portion of the hydrogen formed in step (d) in at least one of the units selected from the group consisting of a water-gas shift reactor; a hydrogen separation unit; a hydrocarbon synthesis reactor; a catalyst activation unit; a catalyst regeneration unit, a product upgrading unit, and combinations thereof, in order to enhance at least one factor selected from the group consisting of market value of synthetic hydrocarbons; productivity of a hydrocarbon synthesis reactor; activity of a hydrocarbon synthesis catalyst; longevity of a hydrocarbon synthesis catalyst; and any combinations of two or more factors thereof.

13. The process according to claim 1, wherein said carbonaceous feedstream in step (b) comprises a material selected from the group consisting of coal, coke, biomass, tar sand, shale oil, natural gas, any light hydrocarbon having 1 to 5 carbon atoms, and any combinations of two or more materials thereof.

14. The process according to claim 1, wherein said second synthesis gas stream generated by second syngas generator has a $H_2$:CO molar greater than said first synthesis gas stream generated to aid first syngas generator.

15. A process for producing synthetic hydrocarbons and further producing hydrogen and optionally CO in a carbon-to-liquids system comprising two syngas generators operated in parallel, the process comprising:
  (a) converting a carbonaceous feedstream in an oxidative first syngas generator to form a first synthesis gas stream comprising carbon monoxide and hydrogen;
  (b) feeding said first synthesis gas stream or a portion thereof to a hydrocarbon synthesis reactor comprising a hydrocarbon synthesis catalyst under conversion promoting conditions sufficient to produce synthetic hydrocarbons, product water, and oxygenates, thereby generating a hydrocarbon product stream and a process water stream, said hydrocarbon product stream comprising at least a portion of said synthetic hydrocarbons, said process water stream comprising at least a portion of the produced oxygenates dissolved in at least a portion of product water, and said hydrocarbon synthesis catalyst is selected from a group 9 or 10 element;
  (c) treating said process water stream to form an oxygenates-rich stream comprising a reforming reactant and oxygenates originating from said product water, said reforming reactant comprising $C_1$-$C_5$ light hydrocarbon or natural gas, said treating comprising the following steps:
    (c1) passing said process water stream through a distillation unit to form an oxygenates overhead stream; and then
    (c2) stripping said oxygenates overhead stream with a stripping fluid comprising said reforming reactant; and
  (d) passing said oxygenates-rich stream and steam in a non-oxidative second syngas generator under steam reforming promoting conditions with a steam reforming catalyst sufficient for the conversion of said oxygenates and said reforming reactant to form at least hydrogen and optionally carbon monoxide, wherein the steam reforming catalyst comprises rhodium, iridium, osmium, cerium, lanthanum, or mixtures thereof, and to generate a second synthesis gas stream comprising said formed hydrogen and optionally said formed carbon monoxide.

16. The process according to claim 15, wherein said carbonaceous feedstream is a methane-containing stream, and further wherein said reforming reactant in said stripping fluid comprises natural gas or at least one $C_1$-$C_5$ hydrocarbon component of natural gas.

* * * * *